US010980387B2

(12) United States Patent
Shitamoto et al.

(10) Patent No.: US 10,980,387 B2
(45) Date of Patent: Apr. 20, 2021

(54) AUTONOMOUSLY TRAVELING FLOOR WASHER

(71) Applicant: MURATA MACHINERY, LTD., Kyoto (JP)

(72) Inventors: Hideo Shitamoto, Kyoto (JP); Tsuyoshi Nakano, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 296 days.

(21) Appl. No.: 16/328,800

(22) PCT Filed: Aug. 4, 2017

(86) PCT No.: PCT/JP2017/028440
§ 371 (c)(1),
(2) Date: Feb. 27, 2019

(87) PCT Pub. No.: WO2018/043033
PCT Pub. Date: Mar. 8, 2018

(65) Prior Publication Data
US 2019/0208978 A1     Jul. 11, 2019

(30) Foreign Application Priority Data

Aug. 31, 2016  (JP) .............................. JP2016-169668

(51) Int. Cl.
*A47L 11/162*     (2006.01)
*A47L 11/283*     (2006.01)
(Continued)

(52) U.S. Cl.
CPC ............. *A47L 11/4011* (2013.01); *A47L 9/28* (2013.01); *A47L 11/162* (2013.01);
(Continued)

(58) Field of Classification Search
CPC ........ A47L 9/28; A47L 9/2826; A47L 9/2836; A47L 9/2842; A47L 9/2857; A47L 11/00;
(Continued)

(56) References Cited

U.S. PATENT DOCUMENTS

2015/0196182 A1* 7/2015 Hekman ............. A47L 11/4027
134/10
2016/0287044 A1* 10/2016 Tanaka .................. A47L 11/161
2017/0329347 A1* 11/2017 Passot .................. G05D 1/0088

FOREIGN PATENT DOCUMENTS

JP         8-326025 A     12/1996

OTHER PUBLICATIONS

Official Communication issued in International Patent Application No. PCT/JP2017/028440, dated Nov. 7, 2017.

* cited by examiner

*Primary Examiner* — Khoi H Tran
*Assistant Examiner* — Sarah A Tran
(74) *Attorney, Agent, or Firm* — Keating & Bennett, LLP

(57) ABSTRACT

An autonomously traveling floor washer autonomously performs an appropriate cleaning operation so that a washing liquid does not remain on a floor surface. In accordance with a cleaning schedule, the autonomously traveling floor washer autonomously travels and performs cleaning of the floor surface using a squeegee and the washing liquid. If a washing liquid discharge position at a taught data obtaining time is not included in a squeegee movement track calculated based on a position and a width of the squeegee at the taught data obtaining time, the cleaning schedule is modified so that the washing liquid discharge position is included in the squeegee movement track.

5 Claims, 20 Drawing Sheets

(51) Int. Cl.
    *A47L 11/293*     (2006.01)
    *A47L 11/30*     (2006.01)
    *A47L 11/40*     (2006.01)
    *A47L 9/28*     (2006.01)
    *G05D 1/02*     (2020.01)

(52) U.S. Cl.
    CPC .............. *A47L 11/283* (2013.01); *A47L 11/30* (2013.01); *A47L 11/40* (2013.01); *G05D 1/02* (2013.01); *G05D 1/0219* (2013.01); *A47L 2201/04* (2013.01); *A47L 2201/06* (2013.01); *G05D 2201/0203* (2013.01)

(58) Field of Classification Search
    CPC ........ A47L 11/04; A47L 11/10; A47L 11/161; A47L 11/162; A47L 11/1625; A47L 11/283; A47L 11/29; A47L 11/293; A47L 11/30; A47L 11/305; A47L 11/40; A47L 11/4008; A47L 11/4011; A47L 11/4044; A47L 11/408; A47L 11/4083; A47L 11/4088; A47L 13/00; A47L 13/10; A47L 13/11; A47L 2201/00; A47L 2201/04; A47L 2201/06; G05D 1/02; G05D 1/0088; G05D 1/0219; G05D 1/0221; G05D 2201/0203; G05B 19/42; G05B 19/4202; G05B 19/4205; G05B 19/4207; G05B 19/421; G05B 19/423; G05B 19/425; G05B 19/427
See application file for complete search history.

| Taught data obtaining time | Taught position information | | | | Taught cleaning conditions | | | | Radius of curvature |
|---|---|---|---|---|---|---|---|---|---|
| $T_0$ | $x_0$ | $y_0$ | | $\theta_0$ | $S_0$ | $W_0$ | | $P_0$ | $\rho_0$ |
| $T_1$ | $x_1$ | $y_1$ | | $\theta_1$ | $S_1$ | $W_1$ | | $P_1$ | $\rho_1$ |
| $T_2$ | $x_2$ | $y_2$ | | $\theta_2$ | $S_2$ | $W_2$ | | $P_2$ | $\rho_2$ |
| $T_3$ | $x_3$ | $y_3$ | | $\theta_3$ | $S_3$ | $W_3$ | | $P_3$ | $\rho_3$ |
| ... | ... | ... | | ... | ... | ... | | ... | ... |
| $T_{n-1}$ | $x_{n-1}$ | $y_{n-1}$ | | $\theta_{n-1}$ | $S_{n-1}$ | $W_{n-1}$ | | $P_{n-1}$ | $\rho_{n-1}$ |
| $T_n$ | $x_n$ | $y_n$ | | $\theta_n$ | $S_n$ | $W_n$ | | $P_n$ | $\rho_n$ |

500

FIG. 10

AUTONOMOUSLY TRAVELING FLOOR WASHER

BACKGROUND OF THE INVENTION

1. Field of the Invention

The present invention relates to an autonomously traveling floor washer that reproduces a taught cleaning condition and travel route so as to autonomously travel and perform cleaning.

2. Description of the Related Art

Conventionally, there is known an autonomously traveling floor washer (hereinafter referred to as a washer), which reproduces a travel route and cleaning condition taught by a user's operation so as to autonomously travel along the taught travel route and autonomously perform cleaning according to the taught cleaning condition (see, for example, JP-A-2015-58131). This washer moves on a floor surface while performing a cleaning operation, in which washing liquid is supplied to the floor surface, the floor surface is cleaned with a washing brush or the like, and then the used washing liquid may be collected by a squeegee.

A user may make mistakes when the user uses the washer disclosed in JP-A-2015-58131, or an unskilled user may operate without considering the structure of the washer (such as a positional relationship between the squeegee and a washing liquid supply port). Because of these erroneous operations, a cleaning schedule that disables the collection of the used washing liquid by the squeegee may be generated. As a result, when the washer autonomously performs the cleaning operation in accordance with such the cleaning schedule, the used washing liquid remains on the floor surface and the washing cannot be performed appropriately.

SUMMARY OF THE INVENTION

Preferred embodiments of the present invention autonomously perform a cleaning operation appropriately so that a washing liquid does not remain on a floor surface by using a washer that autonomously performs the cleaning operation with the washing liquid as taught by a user.

A plurality of aspects of various preferred embodiments of the present invention are described below. These aspects can be arbitrarily combined as necessary.

An autonomously traveling floor washer according to one aspect of a preferred embodiment of the present invention reproduces a taught cleaning condition and a travel route so as to autonomously travel and perform cleaning. The autonomously traveling floor washer includes a cleaning unit, a traveling unit, a position estimating unit, a cleaning condition teaching unit, a travel route teaching unit, a taught data obtaining unit, a cleaning schedule generation unit, a cleaning schedule modifying unit, and a cleaning reproduction unit.

The cleaning unit includes a washing liquid discharge port that discharges a washing liquid to a floor surface and a squeegee that collects the washing liquid remaining on the floor surface, so as to clean the floor surface in accordance with the cleaning condition. The traveling unit travels in accordance with an operator's operation or a travel control command. The position estimating unit estimates position information containing position and direction information of the traveling unit on the travel route in a predetermined coordinate system. The cleaning condition teaching unit receives an input of the cleaning condition provided by the operator and outputs the cleaning condition to the cleaning unit. The travel route teaching unit receives a moving operation of the traveling unit provided by the operator.

The taught data obtaining unit obtains taught position information and a taught cleaning condition at a taught data obtaining time, when a manual operation teaching mode is executed. In the manual operation teaching mode, the cleaning condition and the travel route are taught based on the operator's operation. The taught position information is the position information estimated by the position estimating unit. The taught cleaning condition is the cleaning condition taught by the cleaning condition teaching unit.

The cleaning schedule generation unit generates and stores a cleaning schedule. The cleaning schedule is data in which the taught position information and the taught cleaning condition are associated with the taught data obtaining time.

The cleaning schedule modifying unit modifies the cleaning schedule so that a washing liquid discharge position is included in a squeegee movement track, if the washing liquid discharge position at the taught data obtaining time is not included in the squeegee movement track at the taught data obtaining time. The squeegee movement track is a movement track of the squeegee calculated based on a position and width of the squeegee at the taught data obtaining time. The washing liquid discharge position is calculated based on a position of the washing liquid discharge port at the taught data obtaining time.

The cleaning reproduction unit calculates a reproduced cleaning condition and a reproduced travel control command at a predetermined elapsed time from a start of execution of an autonomous cleaning mode, based on the taught data obtaining time, the taught cleaning condition, and the taught position information, which are stored in the cleaning schedule generated by the cleaning schedule generation unit or the cleaning schedule modified by the cleaning schedule modifying unit. The cleaning reproduction unit outputs the reproduced cleaning condition and the reproduced travel control command to the cleaning unit and the traveling unit, respectively. The autonomous cleaning mode is a mode in which the autonomous travel and cleaning is performed.

In the autonomously traveling floor washer described above, if a washing liquid discharge position that is not included in the squeegee movement track in the cleaning schedule generated by the cleaning schedule generation unit exists, the cleaning schedule modifying unit modifies the cleaning schedule and generates a new cleaning schedule such that the washing liquid discharge position is included in the squeegee movement track.

When the modified cleaning schedule is generated, the cleaning reproduction unit outputs the reproduced cleaning condition calculated based on the modified cleaning schedule to the cleaning unit and outputs the reproduced travel control command calculated based on the modified cleaning schedule to the traveling unit.

In this way, even if the cleaning schedule in which the cleaning operation is performed such that used washing liquid remains on the floor surface is generated when the manual operation teaching mode is executed, the autonomously traveling floor washer is able to modify the cleaning schedule so as to autonomously perform the cleaning operation appropriately so that washing liquid does not remain on the floor surface.

The cleaning schedule modifying unit may calculate the squeegee movement track based on positions and widths of the squeegee at two taught data obtaining time points and a plurality of virtual positions and widths of the squeegee assumed between the two points.

In this way, it is possible to calculate a squeegee movement track that indicates appropriately an actual movement of the squeegee. As a result, it is possible to check more accurately whether or not a washing liquid discharge position is included in the squeegee movement track.

The cleaning condition may include a discharge amount of the washing liquid discharged from the washing liquid discharge port. In this case, the cleaning schedule modifying unit sets the discharge amount of the washing liquid to zero at a washing liquid discharge position that is not included in the squeegee movement track, so as to modify the cleaning schedule.

By modifying the cleaning schedule so that the washing liquid is not discharged at a washing liquid discharge position that is not included in the squeegee movement track, it is possible to generate a new cleaning schedule in which the washing liquid is supplied only at washing liquid discharge positions that are included in the squeegee movement track.

The cleaning unit may further include a suction port to suck washing liquid located on the floor surface. In this case, the cleaning condition includes a suction force of the suction port to suck the washing liquid. The cleaning schedule modifying unit increases the suction force to suck the washing liquid at a washing liquid discharge position that is not included in the squeegee movement track, so as to modify the cleaning schedule.

By increasing the suction force to suck the washing liquid at a washing liquid discharge position that is not included in the squeegee movement track, a collecting area of the squeegee to collect washing liquid is enlarged. Thus, the washing liquid discharge position is able to be included in the squeegee movement track in the modified cleaning schedule.

The cleaning schedule modifying unit may determine whether or not a washing liquid discharge position is included in the squeegee movement track, in period from a current taught data obtaining time to a taught data obtaining time after a predetermined elapsed time. In this way, when the autonomous cleaning mode is executed, it is possible to reduce or prevent inappropriate cleaning such that washing liquid discharged at a certain elapsed time remains on the floor surface for a long period.

An autonomously traveling floor washer according to a preferred embodiment of the present invention autonomously performs a cleaning operation appropriately so that washing liquid does not remain on a floor surface, even if an inappropriate cleaning schedule is generated in a manual operation teaching mode.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 10 is a diagram illustrating an example of a cleaning schedule.

DETAILED DESCRIPTION OF THE PREFERRED EMBODIMENTS

First Preferred Embodiment

Figure 1:
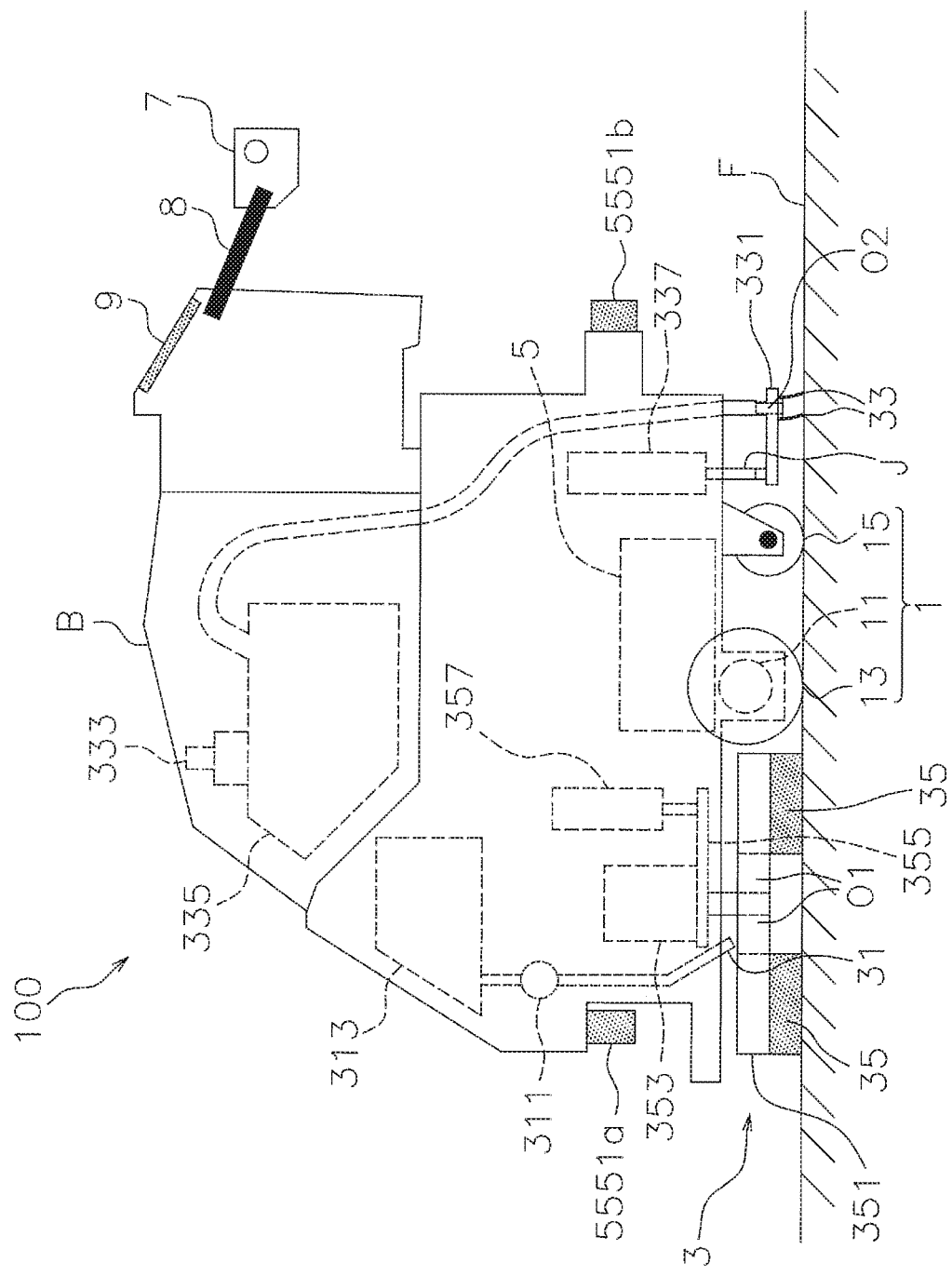
FIG. 1 is a diagram illustrating an overall structure of an autonomously traveling floor washer.

First, an overall structure of an autonomously traveling floor washer according to the first preferred embodiment of the present invention is described with reference to FIG. 1. FIG. 1 is a diagram illustrating an overall structure of an autonomously traveling floor washer 100. The autonomously traveling floor washer 100 illustrated in FIG. 1 (hereinafter abbreviated as the washer 100) reproduces a taught cleaning condition and a travel route faithfully so as to autonomously perform a cleaning operation. The "taught cleaning condition" represents a condition of cleaning (cleaning condition) performed by an operator's manual operation when the washer 100 is in a condition in which the washer 100 is available for manual operation. In addition, the "taught travel route" represents a route along which the washer 100 is moved by the operator's manual operation (moving operation).

The washer 100 includes a traveling unit 1. The traveling unit 1 is an apparatus that drives the washer 100 to travel. The traveling unit 1 includes a travel motor 11 and a main wheel 13 disposed on each of left and right ends of a bottom portion of a main body B, and the main wheel 13 is attached to an output rotation shaft of the travel motor 11 so as to rotate in accordance with rotation of the travel motor 11.

According to another preferred embodiment of the present invention, the traveling unit 1 may include, for example, an auxiliary wheel 15 rotatably disposed on each of the left and right ends of the bottom portion of the main body B in rear of the main wheel 13. In this way, the washer 100 is able to be stabilized. According to still another preferred embodiment of the present invention, the auxiliary wheel 15 may be disposed in front of the main wheel 13 in consideration of a position of center of gravity of the washer 100.

The washer 100 includes a cleaning unit 3. The cleaning unit 3 is a device disposed at the bottom of the main body B so as to clean a floor surface F in accordance with a designated cleaning condition. Details of the cleaning unit 3 will be described later.

The washer 100 includes a control unit 5. The control unit 5 is a computer system equipped with a CPU, a storage device (such as a RAM, a ROM, a hard disk drive, or an SSD), various interfaces, and etc. The control unit 5 is configured or programmed to perform various controls for the washer 100. The detail of a structure of the control unit 5 will be described later.

The washer 100 includes a travel route teaching unit 7. The travel route teaching unit 7 is a device that receives a moving operation of the traveling unit 1 by the operator. The travel route teaching unit 7 is mounted on the upper rear side of the main body B via a mount 8. In this way, the operator can operate the travel route teaching unit 7 so as to move the traveling unit 1. Details of the travel route teaching unit 7 will be described later.

As another preferred embodiment, the travel route teaching unit 7 may not be mounted on the main body B. In this case, the travel route teaching unit 7 can be a controller such as a joystick, for example. In this way, the operator can control the washer 100 in a remote manner.

The washer 100 includes a setting unit 9. The setting unit 9 is a console panel to make various settings for the washer 100 and is mounted on a surface of the main body B on the upper rear side. In addition, the setting unit 9 is disposed near the travel route teaching unit 7. In this way, the operator can operate the setting unit 9 while operating the travel route teaching unit 7 so as to move the traveling unit 1.

According to another preferred embodiment of the present invention, the setting unit 9 may not be mounted on the main body B. In this case, the setting unit 9 is a console such as a portable terminal capable of wireless communication. In this way, the operator can set the washer 100 remotely.

According to still another preferred embodiment of the present invention, the travel route teaching unit 7 and the setting unit 9 may be integrated. In this way, it is easy to operate the traveling unit 1 and the setting unit simultaneously.

Next, a structure of the cleaning unit 3 is described with reference to FIG. 1. The cleaning unit 3 cleans the floor surface F in accordance with a cleaning condition.

The cleaning unit 3 includes a washing liquid discharge port 31. The washing liquid discharge port 31 is, for example, a hollow member that discharges washing liquid from one end. For example, a first end of the hollow member defining the washing liquid discharge port 31 is disposed at a position corresponding to a hollow O1 located in a fixing member 351 that fixes a cleaning member 35. Further, a second end of the hollow member defining the washing liquid port 31 is connected to an outlet side of a washing liquid supply pump 311 that supplies the washing liquid.

An inlet side of the washing liquid supply pump 311 is connected to an outlet of a washing liquid supply tank 313 that is mounted inside the main body B and stores the washing liquid. With this structure, the washing liquid stored in the washing liquid supply tank 313 is supplied to the washing liquid discharge port 31 while the supply amount thereof is adjusted by the washing liquid supply pump 311, and the washing liquid is discharged to the floor surface F from one end of the washing liquid discharge port 31 through the hollow O1. Water can be used as the washing liquid, for example.

The cleaning unit 3 includes a squeegee 33. The squeegee 33 is fixed to a squeegee fixing member 331 and is disposed on the bottom rear side of the main body B, so as to collect washing liquid remaining on the floor surface F (used washing liquid after washing the floor surface F). The squeegee 33 extends in a width direction of the main body B by a predetermined length. When the squeegee 33 moves along with movement of the main body B, it forms a region defined by a movement track of the main body B and a length of the squeegee 33 in the width direction (referred to as a squeegee movement track). The squeegee 33 collects washing liquid within the squeegee movement track.

Figure 5:
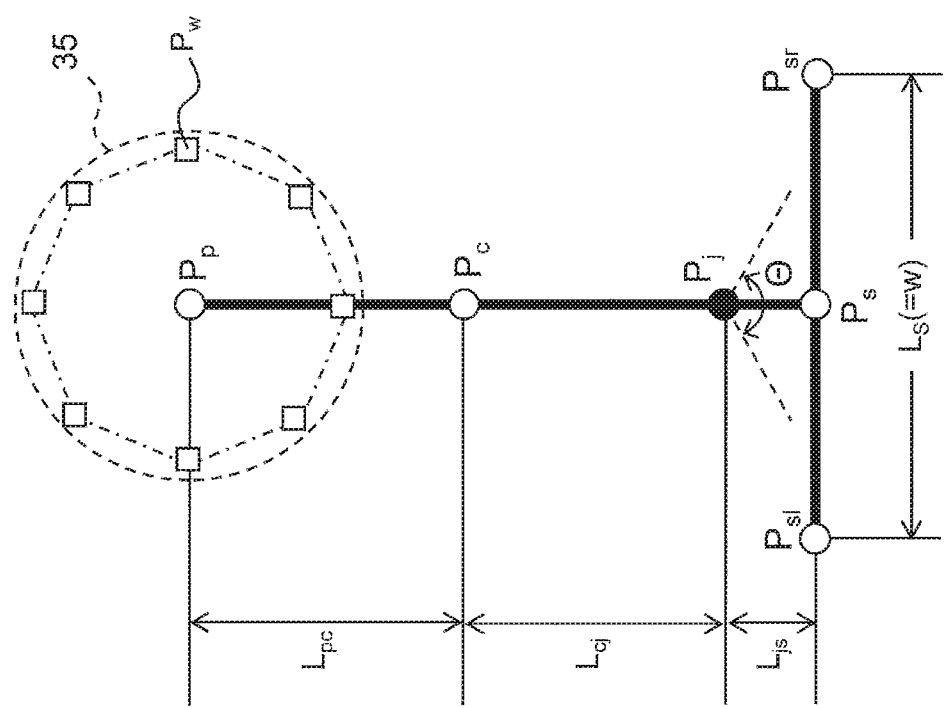
FIG. 5 is a diagram illustrating an example of a virtual model of the washer.

The squeegee fixing member 331 is connected to the main body B with a joint J and can rotate about the joint J within a predetermined angle range (denoted by 8) (FIG. 5). By the squeegee fixing member 331 being rotated, an angle of the squeegee 33 in a front and rear direction of the main body B (movement direction of the washer 100) is changed.

In another preferred embodiment of the present invention, the squeegee fixing member 331 may be provided with a suction port O2. The suction port O2 is connected to a collection member 335 (for example, a container with a hollow) in which negative pressure is generated by suction by a suction motor 333. In this way, when the collection member 335 generates a negative pressure by suction generated by the suction motor 333, the suction port O2 generates a suction force P. As a result, the suction port O2 can suck washing liquid and dust collected by the squeegee 33 with the suction force P so as to convey the same to the collection member 335. The suction force P generated at the suction port O2 can be adjusted by adjusting an output of the suction motor 333, for example.

In still another preferred embodiment of the present invention, the squeegee fixing member 331 may be connected to a squeegee lift actuator 337 via the joint J, so that it can move up and down with respect to the floor surface F. In this way, the squeegee 33 can be arbitrarily set to contact with the floor surface F or to be separated from the floor surface F. As a result, the squeegee 33 can prevent liquid (such as the washing liquid) on the floor surface F from flowing backward from the washer 100, if necessary.

In still another preferred embodiment of the present invention, when the washer 100 travels backward, the squeegee 33 may be separated from the floor surface F. In this way, it is possible to prevent liquid or the like on the floor surface F from moving backward from the washer 100 in backward travel. As a result, the washer 100 can efficiently clean the floor surface F.

The cleaning unit 3 includes the cleaning member 35. The cleaning member 35 is fixed to the fixing member 351 disposed on a bottom front side of the main body B so as to clean the floor surface F. The fixing member 351 is connected to an output rotation shaft of a cleaning member rotating motor 353. Thus, when the cleaning member rotating motor 353 rotates, the cleaning member 35 rotates on the floor surface F where the washing liquid exists, so as to clean the floor surface F.

In another preferred embodiment, the cleaning member 35 may be connected to a cleaning member pressing actuator 357 via a pressing member 355. In this way, the cleaning member 35 can clean the floor surface F when it rotates while being pressed to the floor surface F. A cleaning ability of the cleaning member 35 for the floor surface F can be adjusted by adjusting a rotational frequency of the cleaning member rotating motor 353 and a pressing force of the cleaning member pressing actuator 357. A floor surface cleaning brush or the like can be used as the cleaning member 35, for example.

With the cleaning unit 3 having the structure described above, the washer 100 can perform various cleaning operations such as cleaning of the floor surface F and collection of liquid (washing liquid) or the like on the floor surface F.

Figure 2:
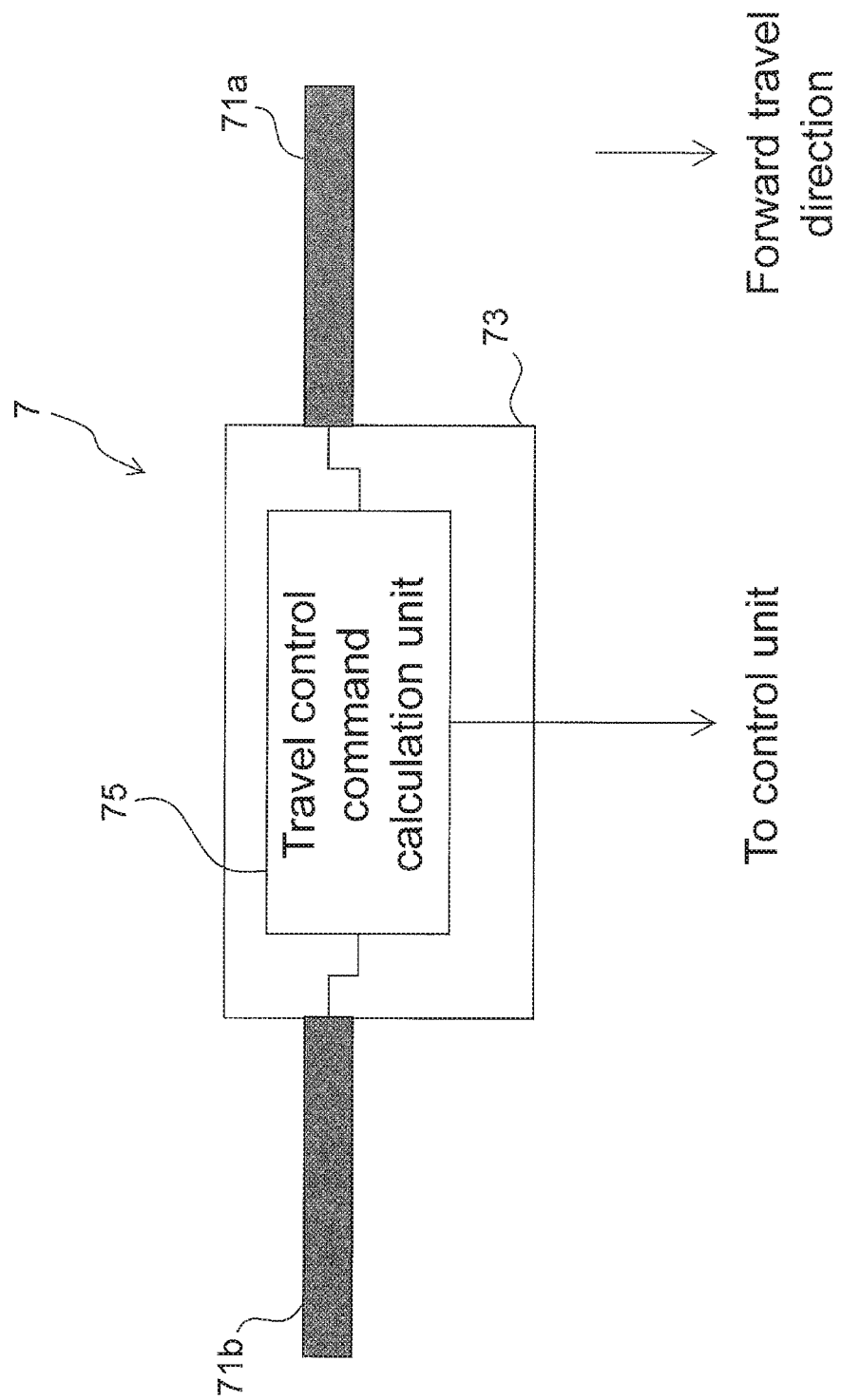
FIG. 2 is a diagram illustrating an example of a structure of a travel route teaching unit.

Next, an example of a structure of the travel route teaching unit 7 according to the first preferred embodiment is described with reference to FIG. 2. FIG. 2 is a diagram illustrating an example of a structure of the travel route teaching unit.

The travel route teaching unit 7 includes handles 71a and 71b. The handles 71a and 71b are attached to left and right sides of a case 73, respectively. The handles 71a and 71b are used when a user operates the washer 100.

For example, an operator who grasps the handles 71a and 71b can apply a force to the washer 100 via the handles 71a and 71b so as to pull the washer 100 toward the operator or to push the washer 100. By adjusting forces to be applied to the handles 71a and 71b, respectively, the operator can adjust a traveling direction of the washer 100. For example, when a force to pull the washer 100 is applied to the left handle 71a viewed from the front direction of the washer 100, the washer 100 turns left.

The handles 71a and 71b are rotatably attached to the case 73. In addition, the handles 71a and 71b are connected to the control unit 5 via a travel control command calculation unit 75. The travel control command calculation unit 75 converts rotations of the handles 71a and 71b to electric signals and outputs the electric signals to the control unit 5. In this way, the operator can operate the washer 100 (traveling unit 1) by rotating operations of the handles 71a and 71b.

For example, the operator may switch between forward travel and backward travel of the washer 100 by adjusting rotation directions of the handles 71a and 71b. In addition, the travel speed of the washer 100 may be adjusted by adjusting rotation amounts of the handles 71a and 71b. Furthermore, a rotation amount between a rotation amount of the handle 71a and a rotation amount of the handle 71b may be differentiated so as to change a travel direction of the washer 100.

According to another preferred embodiment of the present invention, the handle 71a may be an input interface to instruct a travel speed in a travel direction, while the handle 71b may be an input interface to instruct a steering angle.

Figure 3:
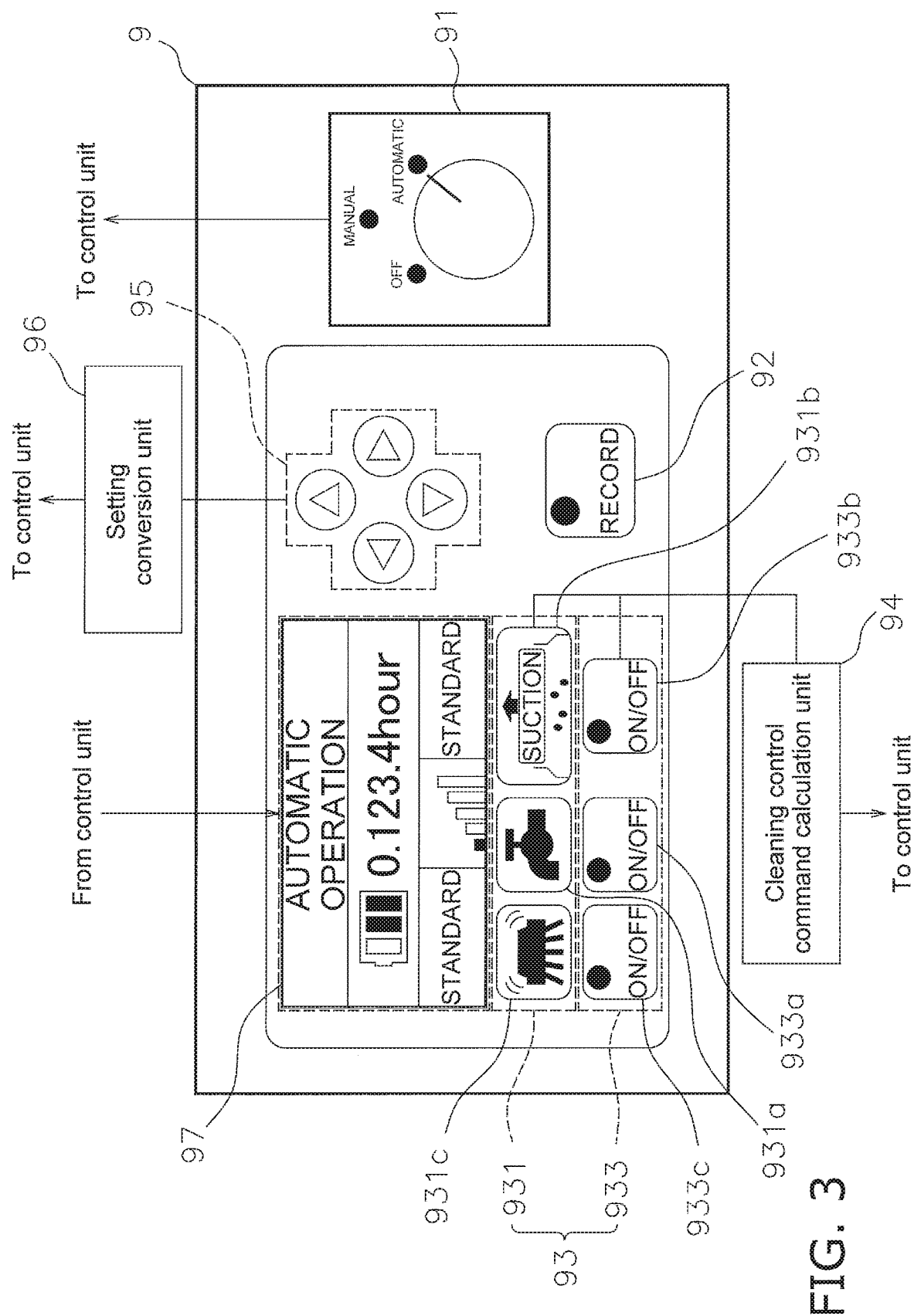
FIG. 3 is a diagram illustrating a structure of a setting unit.

Next, a structure of the setting unit 9 is described with reference to FIG. 3. FIG. 3 is a diagram illustrating a structure of the setting unit.

The setting unit 9 includes a switch unit 91. The switch unit 91 selects an operation mode of the washer 100 and outputs the same to the control unit. As the operation mode of the washer 100, an autonomous cleaning mode and a manual operation mode exist. The autonomous cleaning mode is an operation mode in which the washer 100 autonomously travels and cleans the floor surface F. On the other hand, the manual operation mode is an operation mode in which the washer 100 can be manually operated by the operator.

The switch unit 91 can include a selector switch as illustrated in FIG. 3, for example. In this case, the autonomous cleaning mode can be selected by switching the switch unit 91 to "AUTOMATIC" illustrated in FIG. 3, for example. On the other hand, the manual operation mode can be selected by switching the switch unit 91 to "MANUAL" illustrated in FIG. 3, for example.

The setting unit 9 includes a manual operation recording switch 92. The manual operation recording switch 92 is a switch to start or finish recording of a manual operation of the washer 100 by the operator. Specifically, when the operation mode is set to the manual operation mode by the switch unit 91 and then the manual operation recording switch 92 is switched, a manual operation teaching mode starts as a sub operation mode of the manual operation mode. In the manual operation teaching mode, a cleaning condition and a travel route set by the manual operation of the operator are taught to the washer 100. On the other hand, when the manual operation recording switch 92 is switched during execution of the manual operation teaching mode, the manual operation teaching mode ends.

As the manual operation teaching mode can be started and stopped with the manual operation recording switch 92, the manual operation teaching mode can start or end at any timing. As a result, a cleaning schedule 500 desired by the operator can be generated.

The manual operation recording switch 92 can be a push button switch as illustrated in FIG. 3, for example. In this case, the manual operation recording switch 92 is switched by pressing the push button switch.

In another preferred embodiment, when the manual operation recording switch 92 is switched during execution of the manual operation teaching mode, the operation mode may be switched from the manual operation teaching mode to the manual operation mode. In this way, the operator can continue the manual operation of the washer 100 even when the manual operation teaching mode is switched to the manual operation mode.

The setting unit 9 includes a cleaning condition teaching unit 93. The cleaning condition teaching unit 93 receives an input of the cleaning condition by the operator and outputs the same to a cleaning control command calculation unit 94. The cleaning control command calculation unit 94 is a signal conversion circuit or a computer system which converts the cleaning condition inputted by the cleaning condition teaching unit 93 into a signal that the control unit 5 can handle.

As illustrated in FIG. 3, the cleaning condition teaching unit 93 includes a cleaning condition adjusting unit 931. The cleaning condition adjusting unit 931 includes a supply amount adjusting unit 931a that sets a supply amount S of the washing liquid discharged from the washing liquid discharge port 31 (an example of a discharge amount) as the taught cleaning condition. The supply amount adjusting unit 931a can include a push button switch, for example, and it can set the supply amount S based on the number of times the button is pressed.

In another preferred embodiment of the present invention, the cleaning condition adjusting unit 931 may include a suction force adjusting unit 931b that sets the suction force P of the suction port O2 as the taught cleaning condition. The suction force adjusting unit 931b is a push button switch, for example, and it can adjust the suction force P based on the number of times the button is pressed. In this way, it is possible to adjust a range in which washing liquid can be sucked on the floor surface F.

In still another preferred embodiment, the cleaning condition adjusting unit 931 may include a cleaning ability adjusting unit 931c that sets cleaning ability W of the cleaning member 35 on the floor surface F as the taught cleaning condition. The cleaning ability adjusting unit 931c is a push button switch, for example, and it can adjust the cleaning ability W of the cleaning member 35 on the floor surface F based on the number of times the button is pressed.

In still another preferred embodiment of the present invention, the cleaning condition adjusting unit 931 may include all the supply amount adjusting unit 931a, the suction force adjusting unit 931b, and the cleaning ability adjusting unit 931c. In this way, it is possible to set the taught cleaning condition in which the supply amount S of the washing liquid, the suction force P of the suction port O2, and/or the cleaning ability W of the floor surface F are individually adjusted.

The cleaning condition teaching unit 93 includes an operation switch unit 933. The operation switch unit 933 includes a supply switch unit 933a to start or stop supplying the washing liquid from the washing liquid discharge port 31. The supply switch unit 933a may include a push button switch, for example, and it can switch between starting and stopping of the supply of the washing liquid when the button is pressed.

In another preferred embodiment of the present invention, the operation switch unit 933 may include a suction switch unit 933b to instruct starting or stopping the suction by the suction port O2. The suction switch unit 933b is a push button switch, for example, and it can switch between starting and stopping of the suction when the button is pressed.

In still another preferred embodiment of the present invention, the operation switch unit 933 may include a cleaning switch unit 933c to instruct start or stop of the cleaning of the floor surface F by the cleaning member 35. The cleaning switch unit 933c is a push button switch, for example, and it can switch between starting and stopping of the cleaning the floor surface F when the button is pressed.

In still another preferred embodiment of the present invention, the operation switch unit 933 may include the supply switch unit 933a, the suction switch unit 933b, and the cleaning switch unit 933c. In this way, starting and stopping of the supply of the washing liquid, the suction from the suction port O2, and/or the cleaning of the floor surface F can be individually switched.

As a result, the washer 100 can perform, for example, a cleaning operation in which the suction of the washing liquid starts by pressing the suction switch unit 933b after stopping the supply of the washing liquid by the supply switch unit 933a, and/or a cleaning operation in which cleaning of the floor surface F starts by pressing the cleaning switch unit 933c after an elapsed time from the stop of the supply of the washing liquid by the supply switch unit 933a. This elapsed time is necessary for the washing liquid to settle on the floor surface F.

The setting unit 9 includes the cleaning control command calculation unit 94. The cleaning control command calculation unit 94 is a signal conversion circuit or a computer system that converts the taught cleaning condition set by the cleaning condition adjusting unit 931 and the switch instruction from the operation switch unit 933 into a signal that the control unit 5 can handle, and it outputs the signal to the control unit 5.

The setting unit 9 includes a setting operation unit 95. The setting operation unit 95 includes a push switch, for example, and it receives an input of various settings for the washer 100 and outputs the same to the control unit 5 via a setting conversion unit 96. The setting operation unit 95 enables or disables modifying the generated cleaning schedule 500, a degree of fragmentation of the movement track described later, parameters of a virtual model of the washer 100, and the like.

The setting conversion unit 96 is a signal conversion circuit or a computer system that converts the input received by the setting operation unit 95 into a signal that the control unit 5 can handle.

In another preferred embodiment of the present invention the setting unit 9 may include a display 97. The display 97 displays various settings information currently set for the washer 100. The display 97 is, for example, a liquid crystal display, an organic EL display, or other display.

The display 97 displays, for example, the supply amount S of the washing liquid from the washing liquid discharge port 31, the cleaning ability W of the cleaning member 35 for the floor surface F, and/or the suction force P of the suction port O2 as the set cleaning condition. In this way, the operator can confirm the displayed cleaning condition while performing the cleaning operation.

In another preferred embodiment of the present invention, the display 97 may further display the current operation mode (the autonomous cleaning mode, the manual operation mode, or the manual operation teaching mode), operation time, remaining capacity of the battery to drive the washer 100, or the like. In still another preferred embodiment, the display 97 may display various setting procedures when making various settings for the washer 100 with the setting operation unit 95. In this way, information on the washer 100 is provided to the user in a visual manner, so that the user can operate the setting unit 9 based on the displayed information.

In another preferred embodiment of the present invention, the display 97 is provided with a touch panel. In this case, the functionality of the switch unit 91, the manual operation recording switch 92, the cleaning condition teaching unit 93, and/or the setting operation unit 95, which are described above, may be realized with the touch panel.

Figure 4:
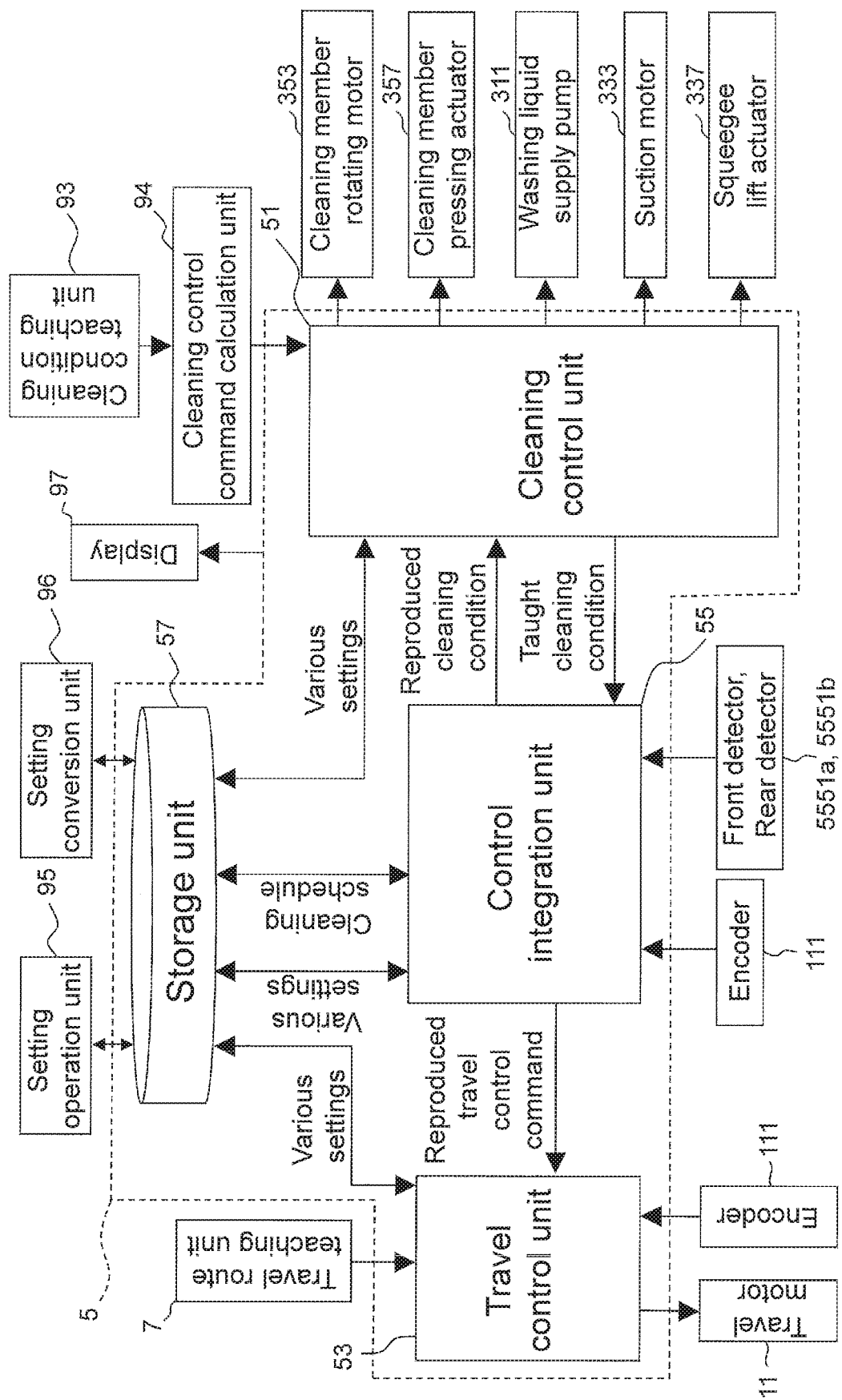
FIG. 4 is a diagram illustrating an overall structure of a control unit.

A structure of the control unit 5 is described below. First, an overall structure of the control unit 5 is described with reference to FIG. 4. FIG. 4 is a diagram illustrating an overall structure of the control unit. All or a portion of the functions and functional blocks of the control unit 5 described below may be realized by a program or programs that can be executed on the computer system of the control unit 5. In this case, the program or programs may be stored in a memory and/or a storage device. All or a portion of the functions or functional blocks of the control unit 5 may be realized as a custom IC such as a System on Chip (SoC).

The control unit 5 may include a single computer system or may include a plurality of computer systems. In the case where a plurality of computer systems are included in the control unit 5, for example, the functions to be realized with the plurality of functional blocks of the control unit 5 can be assigned to the plurality of computer system in any ratio for execution.

The control unit 5 includes a cleaning control unit 51. The cleaning control unit 51 supplies powers (referred to as cleaning unit controlled variables) to the cleaning member rotating motor 353, the washing liquid supply pump 311 and the suction motor 333, respectively, so as to control the rotation speeds and outputs of the motors and the pump. In addition, the cleaning control unit 51 supplies power (cleaning unit controlled variable) to the cleaning member pressing actuator 357 to control an operation amount thereof.

In the case where the squeegee lift actuator 337 is provided, the cleaning control unit 51 may output to the actuator a drive signal to move squeegee 33 up and down.

The cleaning control unit 51 receives the taught cleaning condition from the cleaning condition teaching unit 93 via the cleaning control command calculation unit 94, and it controls the cleaning member rotating motor 353, the washing liquid supply pump 311, and the suction motor 333, based on the taught cleaning condition.

In addition, the cleaning control unit 51 receives a reproduced cleaning condition (described later) from the control integration unit 55 and controls the cleaning unit 3 based on the reproduced cleaning condition.

The control unit 5 includes a travel control unit 53. The travel control unit 53 controls the travel motor 11 based on the travel control command based on the rotation amount and the rotation direction of the handles 71a and 71b inputted from the travel route teaching unit 7, or based on the reproduced travel control command inputted from the control integration unit 55.

In addition, the travel control unit 53 calculates the rotation speed of the travel motor 11 based on the pulsed signal outputted from an encoder 111 attached to the output rotation shaft of the travel motor 11. In this way, the travel control unit 53 can control the travel motor 11 while monitoring the rotation speed of the travel motor 11 (i.e. the rotation speed of the main wheel 13).

The control unit 5 includes the control integration unit 55. The control integration unit 55 integrally controls cleaning and travel operation of the washer 100. Specifically, the control integration unit 55 calculates position information that indicates which position on the floor surface F the washer 100 is moving based on information obtained by a front detector 5551a, a rear detector 5551b, and/or the encoder 111.

When executing the manual operation teaching mode, the control integration unit 55 receives the cleaning condition as the taught cleaning condition from the cleaning control unit 51, and it generates the cleaning schedule 500 using the position information and the taught cleaning condition described above.

On the other hand, when executing the autonomous cleaning mode, the control integration unit 55 calculates the reproduced cleaning condition and the reproduced travel control command based on the data stored in the cleaning schedule 500, and it outputs the reproduced cleaning condition to the cleaning control unit 51 and outputs the reproduced travel control command to the travel control unit 53.

In this way, when executing the autonomous cleaning mode, the cleaning control unit 51 controls the cleaning member rotating motor 353, the washing liquid supply pump 311, the suction motor 333, and/or the cleaning member pressing actuator 357 based on the reproduced cleaning condition, so that the washer 100 can autonomously perform the cleaning operation. In addition, the travel control unit 53 controls the travel motor 11 based on the reproduced travel control command, so that the washer 100 can autonomously travel.

The control unit 5 includes a storage unit 57. The storage unit 57 is a portion of or an entirety of a storage area of the storage device of the computer system of the control unit 5, and it stores various information of the washer 100. Specifically, the storage unit 57 stores the cleaning schedule 500 generated by the control integration unit 55 and various settings for the washer 100 inputted from the setting operation unit 95 and the setting conversion unit 96.

The storage unit 57 stores the virtual model of the washer 100 as illustrated in FIG. 5. FIG. 5 is a diagram illustrating an example of the virtual model of the washer. This virtual model is used to calculate the squeegee movement track described later and washing liquid discharge positions corresponding to individual taught position information.

In the virtual model illustrated in FIG. 5, a point $P_c$ is a center position of the washer 100. Position information estimated by a position estimating unit 5555 includes coordinates of the point $P_c$. A point $P_p$ is a position of the washing liquid discharge port 31, and a point $P_j$ is a position of the joint J. The length $L_{pc}$ between the point $P_c$ and the point $P_p$ and the length $L_{cj}$ between the point $P_c$ and the point $P_j$ are constant.

A point $P_s$ is a position of the suction port O2 (center position of the squeegee 33). A point $P_{sl}$ is a position on the left end of the squeegee 33 (when viewing the washer 100 in the forward travel direction), and a point $P_{sr}$ is a position on the right end of the squeegee 33. The length $L_s$ between the point $P_{sl}$ and the point $P_{sr}$ is a width of the squeegee 33 and has a constant value (w). In addition, the length $L_{js}$ between the point $P_j$ and the point $P_s$ (corresponding to the length of the squeegee fixing member 331) is constant.

In addition, in the virtual model of this preferred embodiment, a position $P_w$ of the washing liquid supplied (discharged) from the washing liquid discharge port 31 is defined at each of vertexes of an inscribed octagon of a circle that is a little smaller than the cleaning member 35. Thus, in the virtual model, the dispersion of the washing liquid supplied from the washing liquid discharge port 31 on the floor surface F that is caused by the rotation of the cleaning member 35 can be taken into consideration.

In another preferred embodiment, the position $P_w$ of the washing liquid may be defined at each of vertexes of a polygon other than the octagon (such as a triangle, a quadrangle, a pentagon, or a hexagon), which is inscribed in a circle a little smaller than the cleaning member 35. A polygon to be selected can be appropriately determined based on processing ability of a cleaning schedule modifying unit 557 (control unit 5), for example.

The cleaning control unit 51, the travel control unit 53, and the control integration unit 55 can read the various settings of the washer 100 and/or the cleaning schedule 500 stored in the storage unit 57 as necessary, so as to execute various adjustments and controls based on the same.

In another preferred embodiment of the present invention, the control unit 5 may include a data recording device (not shown) to record information such as the cleaning schedule 500 stored in the storage unit 57 in other storage media. In still another preferred embodiment, the control unit 5 may include a connection terminal such as a Universal Serial Bus (USB) port or the like, which enables connection to the data recording device.

In this way, information such as the cleaning schedule 500 stored in the storage unit 57 can be stored in other storage media.

Figure 6:
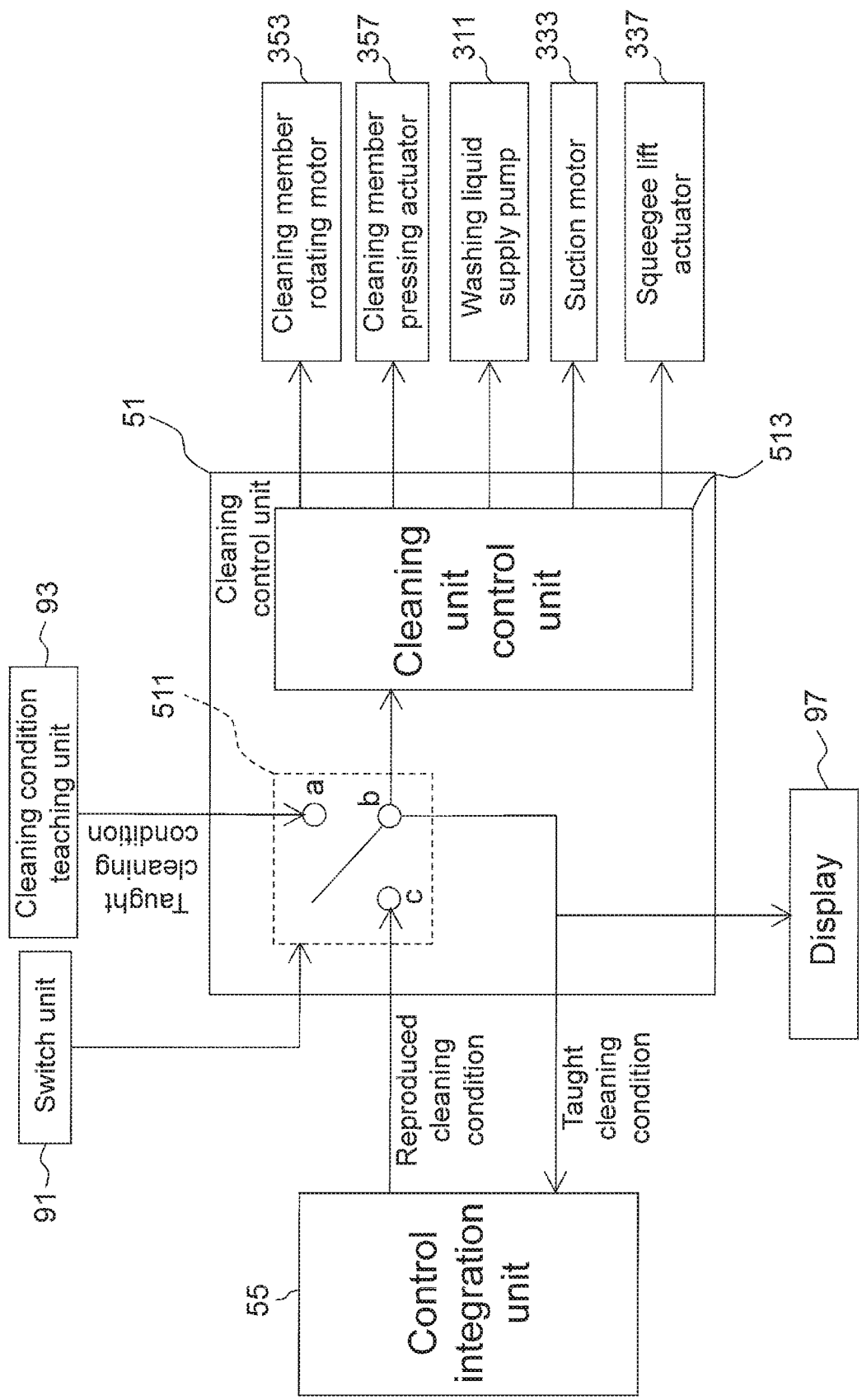
FIG. 6 is a diagram illustrating a detailed structure of a cleaning control unit.

A structure of the cleaning control unit 51 that controls the cleaning unit 3 is described in detail below with reference to FIG. 6. FIG. 6 is a diagram illustrating a detailed structure of the cleaning control unit.

The cleaning control unit 51 includes a cleaning switch unit 511. The cleaning switch unit 511 includes three terminals a, b, and c. The terminal a is connected to the cleaning condition teaching unit 93, the terminal b is connected to a cleaning unit control unit 513 and the control integration unit 55, and the terminal c is connected to the control integration unit 55. If the setting unit 9 includes the display 97, the terminal b may be connected to the display 97.

The cleaning switch unit 511 selects either to connect the terminal b and the terminal a or to connect the terminal b and the terminal c, based on the operation mode selected by the switch unit 91, so as to determine which of the taught cleaning condition and the reproduced cleaning condition should be output to the cleaning unit control unit 513.

Specifically, if the manual operation mode (including the manual operation teaching mode) is selected by the switch unit 91, the cleaning switch unit 511 connects the terminal a and the terminal b so that the cleaning condition teaching unit 93 is connected to the cleaning unit control unit 513 and the control integration unit 55. In this way, when the manual operation mode or the manual operation teaching mode is executed, the cleaning switch unit 511 can transmit the taught cleaning condition set by the cleaning condition teaching unit 93 to the cleaning unit control unit 513 and the control integration unit 55. In addition, when the display 97 is connected to the terminal b, the taught cleaning condition can be displayed on the display 97.

On the other hand, if the autonomous cleaning mode is selected by the switch unit 91, the cleaning switch unit 511 connects the terminal b and the terminal c, so that the control integration unit 55 is connected to the cleaning unit control unit 513. In this way, when the autonomous cleaning mode is executed, the cleaning switch unit 511 can transmit the reproduced cleaning condition outputted from the control integration unit 55 to the cleaning unit control unit 513. In addition, if the display 97 is connected to the terminal b, the reproduced cleaning condition can be displayed on the display 97.

The cleaning unit control unit 513 calculates controlling variables to be outputted to the cleaning member rotating motor 353, the cleaning member pressing actuator 357, the washing liquid supply pump 311, and/or the suction motor 333, based on the received taught cleaning condition or the reproduced cleaning condition, and it outputs drive powers corresponding to the controlling variables to the motor, the pump, and/or the actuator described above.

Specifically, the cleaning unit control unit 513 calculates the rotational frequency of the cleaning member rotating motor 353, and/or the pressing force of the cleaning member pressing actuator 357, based on the cleaning ability W for the floor surface F as the cleaning condition, and it outputs the drive powers corresponding to the rotational frequency and the pressing force to the cleaning member rotating motor 353 and the cleaning member pressing actuator 357, respectively, so as to control the cleaning ability of the cleaning member 35 for the floor surface F.

The cleaning unit control unit 513 calculates a washing liquid flow amount of the washing liquid supply pump 311 based on the supply amount S of the washing liquid as the cleaning condition, and it outputs the drive power corresponding to the flow amount to the washing liquid supply pump 311, so as to control the washing liquid amount discharged from the washing liquid discharge port 31.

The cleaning unit control unit 513 calculates the rotational frequency (and/or output) of the suction motor 333 based on the suction force P as the cleaning condition, and it outputs the drive power corresponding to the rotational frequency (and/or output) to the suction motor 333, so as to control the suction force of the suction port O2.

Further, if the cleaning unit 3 includes the squeegee lift actuator 337, the cleaning unit control unit 513 outputs the drive signal to move the squeegee 33 up and down to the actuator, so that the squeegee 33 can move up and down.

Figure 7:
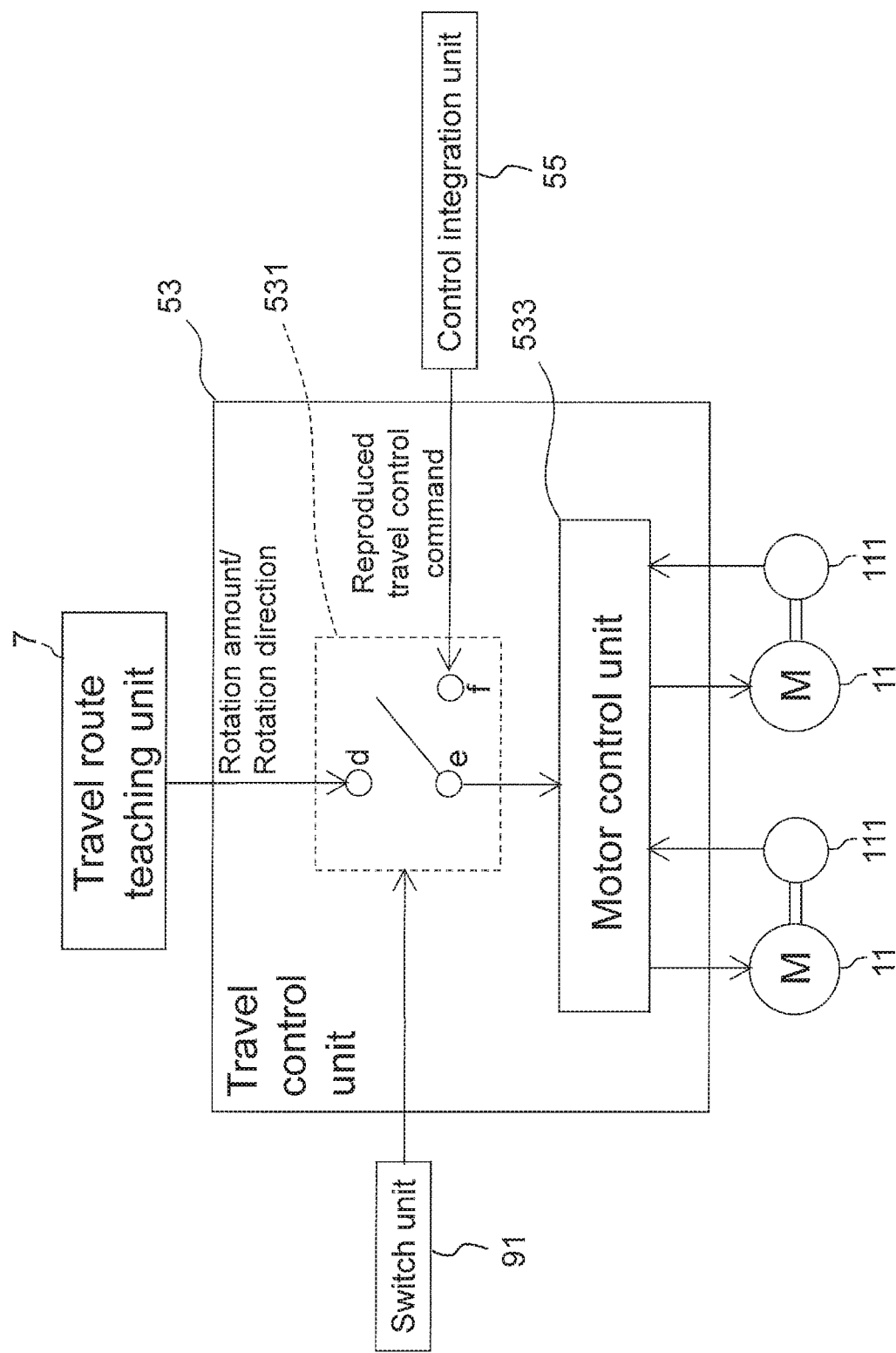
FIG. 7 is a diagram illustrating a detailed structure of a travel control unit.

A structure of the travel control unit 53 that controls the traveling unit 1 is described in detail below with reference to FIG. 7. FIG. 7 is a diagram illustrating a detailed structure of the travel control unit.

The travel control unit 53 includes a travel switch unit 531. The travel switch unit 531 includes three terminals d, e, and f. The terminal d is connected to the travel route teaching unit 7, the terminal e is connected to motor control unit 533, and the terminal f is connected to the control integration unit 55.

The travel switch unit 531 selects either to connect the terminal e and the terminal d or to connect the terminal e and the terminal f, based on the operation mode selected by the switch unit 91.

Specifically, if the manual operation mode (including the manual operation teaching mode) is selected by the switch unit 91, the travel switch unit 531 connects the terminal e and the terminal d, so that the travel route teaching unit 7 is connected to the motor control unit 533. In this way, when the manual operation mode or the manual operation teaching mode is executed, the travel switch unit 531 can transmit to the motor control unit 533 a signal indicating the rotation amount and/or the rotation direction of the handles 71a and 71b of the travel route teaching unit 7.

On the other hand, if the autonomous cleaning mode is selected by the switch unit 91, the travel switch unit 531 connects the terminal e and the terminal f, so that the control integration unit 55 is connected to the motor control unit 533. In this way, when the autonomous cleaning mode is executed, the travel switch unit 531 can transmit the reproduced travel control command outputted from the control integration unit 55 to the motor control unit 533.

The motor control unit 533 calculates a target rotation speed of the travel motor 11 based on the inputted rotation amount/rotation direction of the handles 71a and 71b or the reproduced travel control command, and it outputs to the travel motor 11 the drive power to rotate the travel motor 11 at the target rotation speed.

The motor control unit 533 calculates and feeds back the actual rotation speed of the travel motor 11 based on the pulsed signal from the encoder 111, and it calculates the drive power to be output to the travel motor 11. Therefore, the motor control unit 533 controls the travel motor 11 using, for example, Proportional Integral (PI) control theory, Proportional Integral Differential (PID) control theory, or the like.

In this preferred embodiment, the travel motor 11 and the main wheel 13 are disposed on each of the bottom left and right ends of the main body B. In this case, the motor control unit 533 independently controls rotation speeds and rotation directions of the two travel motors 11 on the left and right sides, so as to determine the travel direction of the washer 100.

In another preferred embodiment, if the control unit 5 includes a plurality of computer systems, the motor control unit 533 may be one of the computer systems. In other words, only the function of the motor control unit 533 may be realized by a single computer system. In this case, the motor control unit 533 is a motor control device using, for example, the PI control theory or the PID control theory.

Figure 8:
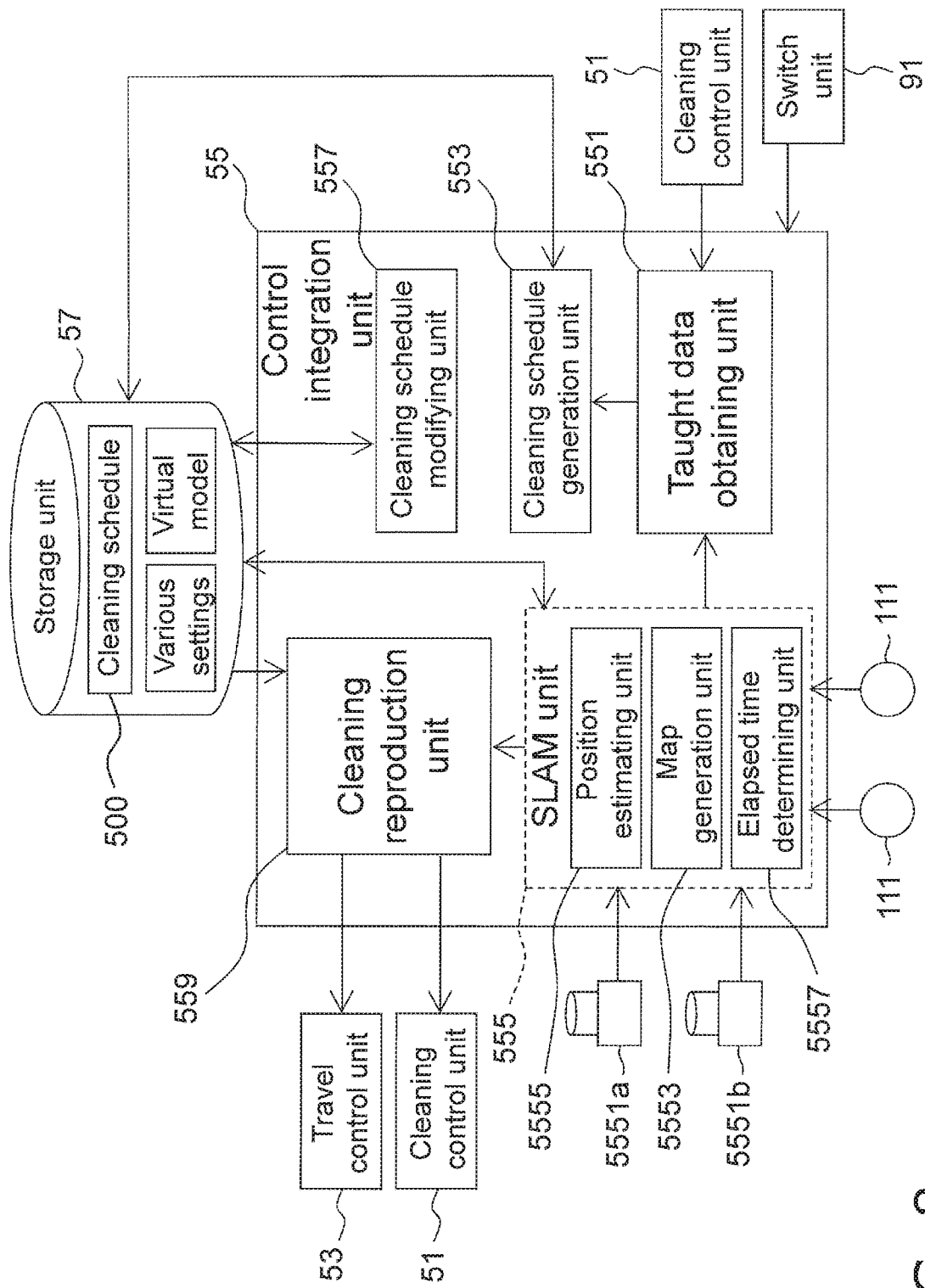
FIG. 8 is a diagram illustrating a detailed structure of a control integration unit.

A structure of the control integration unit 55 is described in detail below with reference to FIG. 8. FIG. 8 is a diagram illustrating a detailed structure of the control integration unit.

The control integration unit 55 includes a taught data obtaining unit 551. The taught data obtaining unit 551 obtains the taught position information and the taught cleaning condition at a taught data obtaining time when the manual operation teaching mode is executed. Specifically, the taught data obtaining unit 551 receives the taught data obtaining time and the taught position information from an SLAM unit 555 (described later). The taught data obtaining unit 551 receives the taught cleaning condition at the taught data obtaining time from the cleaning control unit 51. A system clock of the control unit 5 can be used as the taught data obtaining time, for example.

The taught data obtaining unit 551 outputs the obtained taught data obtaining time, taught position information, and taught cleaning condition to a cleaning schedule generation unit 553.

The cleaning schedule generation unit 553 generates the cleaning schedule 500 by associating the taught position information obtained from the taught data obtaining unit 551, the taught cleaning condition, and the taught data obtaining time with each other, and it stores the cleaning schedule 500 in the storage unit 57.

The SLAM unit 555 estimates information on the position of the washer 100 in a predetermined coordinate system (position information), based on information on an obstacle in front of the washer 100 obtained by the front detector 5551a (FIG. 1) disposed at the front of the main body B, information on an obstacle behind the washer 100 obtained by the rear detector 5551b (FIG. 1) disposed at the rear of the main body B, and a rotation amount of the travel motor 11 obtained by the encoder 111.

Each of the front detector 5551a and the rear detector 5551b includes a laser range finder (LRF) having a detection range of 180 degrees or more, for example. When the laser range finders are used as the front detector 5551a and the rear detector 5551b, a distance between the traveling unit 1 and an obstacle, and a direction to the obstacle are obtained as the information on the obstacle.

In another preferred embodiment, a detection range (detection angle and/or detection distance) of the front detector 5551a may be larger than the detection range of the rear detector 5551b. In this way, it is possible to obtain the information on an obstacle in front of the washer 100 in a larger range.

The control integration unit 55 includes the cleaning schedule modifying unit 557. The cleaning schedule modifying unit 557 calculates the movement track of the squeegee 33 (referred to as the squeegee movement track) when the washer 100 moves according to the cleaning schedule 500, based on the position of the squeegee and the width of the squeegee 33 in each taught position information stored in the cleaning schedule 500, and determines whether or not a washing liquid discharge position stored in the current cleaning schedule 500 is included in the calculated squeegee movement track.

As a result of the determination, if the current cleaning schedule 500 contains a washing liquid discharge position that is not included in the calculated squeegee movement track, the cleaning schedule modifying unit 557 modifies the current cleaning schedule 500 so that the washing liquid discharge position is included in the squeegee movement track, and thus it generates a new cleaning schedule and stores the same in the storage unit 57. The detail of a method of modifying the cleaning schedule 500 by the cleaning schedule modifying unit 557 will be described later.

The control integration unit 55 includes a cleaning reproduction unit 559. The cleaning reproduction unit 559 calculates the reproduced cleaning condition and the reproduced travel control command at a predetermined elapsed time from start of execution of the autonomous cleaning mode, based on the taught data obtaining time, the taught cleaning condition, and the taught position information stored in the cleaning schedule 500, when the autonomous cleaning mode is executed, and it outputs the calculated reproduced cleaning condition and reproduced travel control command to the cleaning control unit 51 and the travel control unit 53, respectively.

The details of structure of the SLAM unit 555 are described below with reference to FIG. 8. The SLAM unit 555 according to this preferred embodiment estimates a position (position information) of the washer 100 and generates map information, by a simultaneous localization and mapping (SLAM) method.

The SLAM unit 555 includes a map generation unit 5553. The map generation unit 5553 generates the map information using information on an obstacle (such as a wall) in the front obtained by the front detector 5551a and information on an obstacle in the rear obtained by the rear detector 5551b. The map information is used to estimate the position information by the position estimating unit 5555. The map information includes a local map and a global map.

The local map is map information on an obstacle (a position of the obstacle) around the washer 100. The local map is generated by coordinate conversion of the information on the obstacle in the front obtained by the front detector 5551a and the information on the obstacle in the rear obtained by the rear detector 5551b, as necessary.

The global map is map information on an obstacle (a position of the obstacle) in the environment (movement environment) in which the washer 100 travels when it cleans the floor surface F. The global map is generated based on the local map obtained when the manual operation teaching mode is executed. Therefore, the local map is stored in the storage unit 57 in association with time when it is obtained (for example, the taught data obtaining time).

In another preferred embodiment, the local map may be stored in the storage unit 57 in association with an estimated position of the washer 100 when it is obtained.

In still another preferred embodiment, the global map may be generated using dedicated software, a CAD, or the like. In this case, the global map generated by the software or the like is converted into data that the control unit 5 of the washer 100 can handle.

The map generation unit 5553 allocates a local map associated with a certain elapsed time and a local map associated with time near the above certain elapsed time to a position of the washer 100 at each elapsed time (allocates the center of the local map to a position of the washer 100 corresponding to the elapsed time), so as to generate map information indicating a portion of the movement environment (for example, a range necessary to estimate the position) as the global map.

In addition, the map generation unit 5553 deletes a portion of the global map generated in the past that becomes unnecessary for position estimation.

In another preferred embodiment of the present invention, if a "loop route problem" (that causes mismatch between a portion of the global map generated in the early stage and the global map generated in the final stage) does not occur, in the case where the movement environment does not form a loop route or other case, map information indicating the entire movement environment may be generated as the global map.

The SLAM unit 555 includes the position estimating unit 5555. The position estimating unit 5555 estimates position information on a position of the washer 100 in a predetermined coordinate system, based on the global map generated by the map generation unit 5553, the local map, and a rotation amount of the travel motor 11.

Specifically, the position information is estimated as follows. It is assumed as one example that a reach position of the washer 100 is estimated when it moves from the position (an estimated position) at a predetermined time (denoted by $t_k$) to the reach position at the next time (denoted by $t_{k+1}$).

First, the position estimating unit 5555 calculates a rotation amount of the main wheel 13 during the period from the time $t_k$ to the time $t_{k+1}$ based on the number of pulses outputted from the encoder 111 during the period from the time $t_k$ to the time $t_{k+1}$, and it estimates a movement distance of the washer 100 due to the rotation of the main wheel 13 based on the rotation amount (dead reckoning).

Next, the position estimating unit 5555 moves a posterior probability at the time $t_k$ (corresponding to a probability distribution indicating a relationship between a position of the washer 100 and a probability of existence of the washer 100 at the position at the time $t_k$) by the movement distance of the washer 100 due to the rotation of the main wheel 13, so as to calculate a prior probability at the time $t_{k+1}$.

In another preferred embodiment of the present invention, the position estimating unit 5555 may enlarge a width of the probability distribution (standard deviation) of the posterior probability after the movement by the movement distance due to the rotation of the main wheel 13, so as to make the prior probability at the time $t_{k+1}$. In this way, it is possible to calculate the prior probability considering slip between the main wheel 13 and the floor surface F.

After that, the position estimating unit 5555 obtains the local map at the time $t_{k+1}$ and the global map from the map generation unit 5553, performs map matching between the local map at the time $t_{k+1}$ and the global map, and estimates position information of the washer 100 at the time $t_{k+1}$.

Specifically, for example, the local map at the time $t_{k+1}$ is allocated at some positions near the estimated position calculated based on the rotation amount of the main wheel 13 on the global map, the local map is rotated about the center thereof if necessary (for example, if the direction of the washer 100 is changed), and thus the map matching is performed.

Based on the result of the map matching, the position estimating unit 5555 calculates likelihood (indicating a relationship between a position of the allocated local map and a matching degree between the global map and the local map at the position).

After that, the position estimating unit 5555 multiplies the likelihood and the prior probability at the time $t_{k+1}$ so as to calculate the posterior probability at the time $t_{k+1}$. The position estimating unit 5555 estimates the position at which the posterior probability at the time $t_{k+1}$ has a maximum value, i.e. the position estimated to have the highest probability of existence of the washer 100, to be the position (position information) of the washer 100 at the time $t_{k+1}$.

The posterior probability at the time $t_{k+1}$ is used as a prior probability in the next position estimation.

As described above, the position estimating unit 5555 performs the position estimation using the movement distance based on the rotation amount of the main wheel 13 and the map information obtained using the front detector 5551a and the rear detector 5551b. Thus, an error contained in the movement distance based on the rotation amount of the main wheel 13 (mainly due to the slip between the main wheel 13 and the floor surface F) and an error contained in the map information (mainly due to the noise components contained in the information obtained by the front detector 5551a and the rear detector 5551b) are reduced in a complementary manner. Consequently, the position estimation can be performed accurately.

The SLAM unit 555 includes an elapsed time determining unit 5557. The elapsed time determining unit 5557 determines the taught data obtaining time and the elapsed time from start of execution of the autonomous cleaning mode. In this preferred embodiment, the elapsed time determining unit 5557 uses a clock function of a microcomputer system of the control unit 5, for example, so as to determine the taught data obtaining time.

On the other hand, the elapsed time from start of execution of the autonomous cleaning mode is determined based on the position estimated by the position estimating unit 5555. Specifically, for example, the taught data obtaining time associated with the position closest to the position of the washer 100 estimated by the position estimating unit 5555 among positions stored in the cleaning schedule 500 is determined as the elapsed time.

In another preferred embodiment of the present invention, the elapsed time described above may be calculated by extracting two positions close to the position estimated by the position estimating unit 5555 from the cleaning schedule 500 and performing linear interpolation between the two positions. In this way, a more accurate elapsed time is calculated.

As the elapsed time from start of execution of the autonomous cleaning mode is determined based on the position estimated by the position estimating unit 5555, the washer 100 can autonomously reproduce the cleaning operation while accurately grasping the timing and place at which the taught cleaning condition is performed when the autonomous cleaning mode is executed.

For example, when the washer 100 reduces the moving speed or stops the movement that are not indicated in the cleaning schedule 500 to avoid an obstacle during the execution of the autonomous cleaning mode, the case where the cleaning operation proceeds as time elapses and the cleaning operation that should not be executed at the current position is executed can be avoided.

Figure 9A:
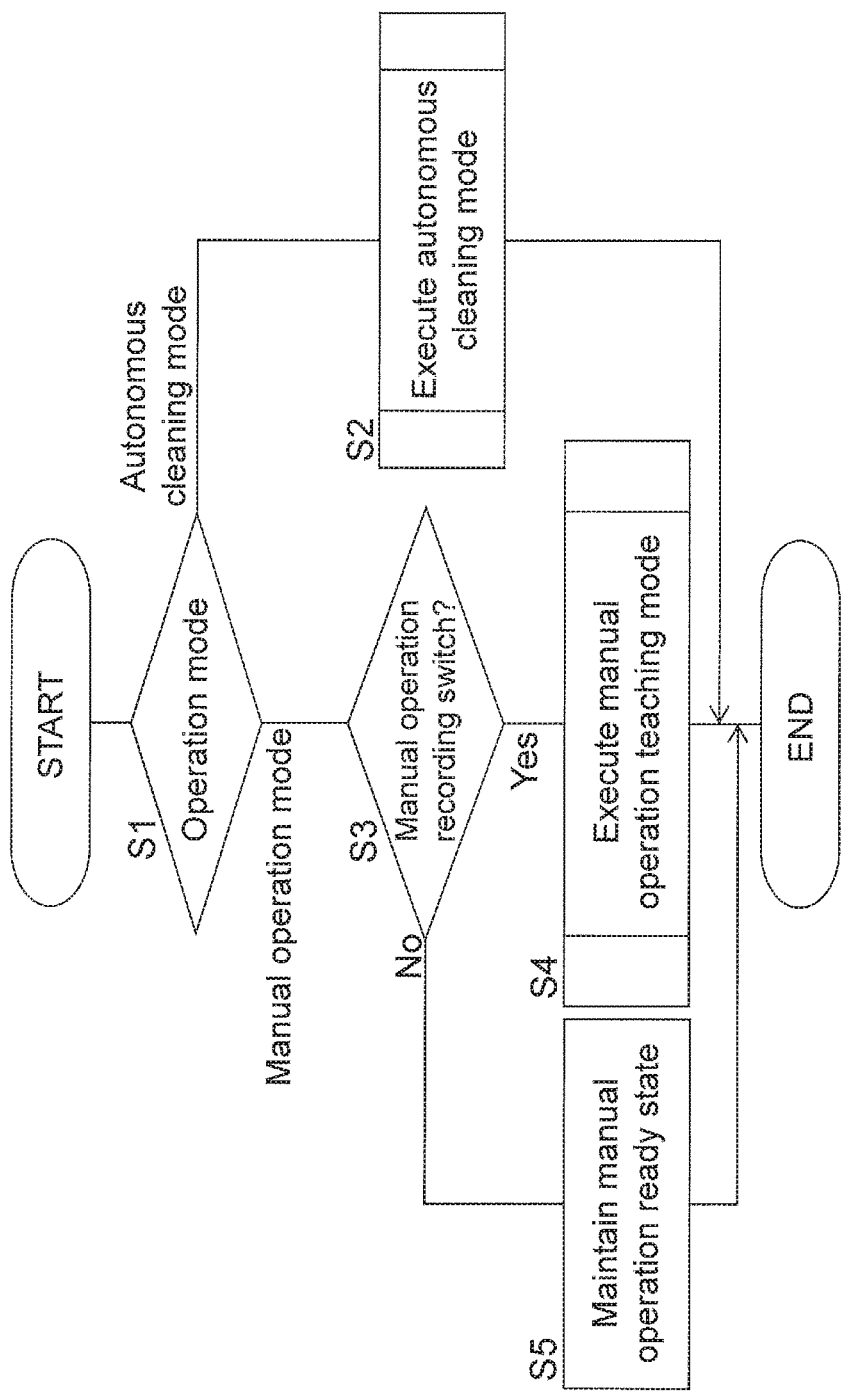
FIG. 9A is a flowchart showing a basic operation of the autonomously traveling floor washer.

An operation of the washer 100 is described below. First, a basic operation of the washer 100 is described with reference to FIG. 9A. FIG. 9A is a flowchart showing a basic operation of the washer.

When the washer 100 starts its operation, the control unit 5 checks a state of the switch unit 91 (Step S1). If the switch unit 91 selects "AUTOMATIC" (in the case of the "Autonomous cleaning mode" in Step S1), the autonomous cleaning mode is executed (Step S2), and the washer 100 autonomously performs the cleaning operation in accordance with the cleaning schedule 500 stored in the storage unit 57.

On the other hand, if the switch unit 91 selects "MANUAL" (in the case of the "Manual operation mode" in Step S1), the control unit 5 determines that the operation mode to be executed is the manual operation mode.

If it is detected that the manual operation recording switch 92 is pressed during the execution of the manual operation mode (in the case of "Yes" in Step S3), the control unit 5 changes the operation mode to the manual operation teaching mode (Step S4). As a result, the cleaning operation by the operator after the timing when the manual operation recording switch 92 is pressed is stored as the cleaning schedule 500.

On the other hand, if the manual operation recording switch 92 is not pressed (in the case of "No" in Step S3), the execution of the manual operation mode is maintained, in which the cleaning operation of the washer 100 by the operator's operation is not recorded (Step S5).

In the Step S4 described above, the control unit 5 monitors whether or not the manual operation recording switch 92 is pressed during the execution of the manual operation teaching mode. If the manual operation recording switch 92 is pressed during the execution of the manual operation teaching mode, the operation mode is switched to the manual operation mode at this timing, the cleaning operation after this timing is not recorded in the cleaning schedule 500. In other words, by pressing the manual operation recording switch 92 when the manual operation teaching mode is executed, the operator can stop the recording (teaching) of the cleaning operation at any timing.

As described above, the washer 100 according to this preferred embodiment can execute the autonomous cleaning mode, the manual operation mode, and the manual operation teaching mode in accordance with selection of the operation mode by the switch unit 91 and whether or not the manual operation recording switch 92 is pressed.

Figure 9B:
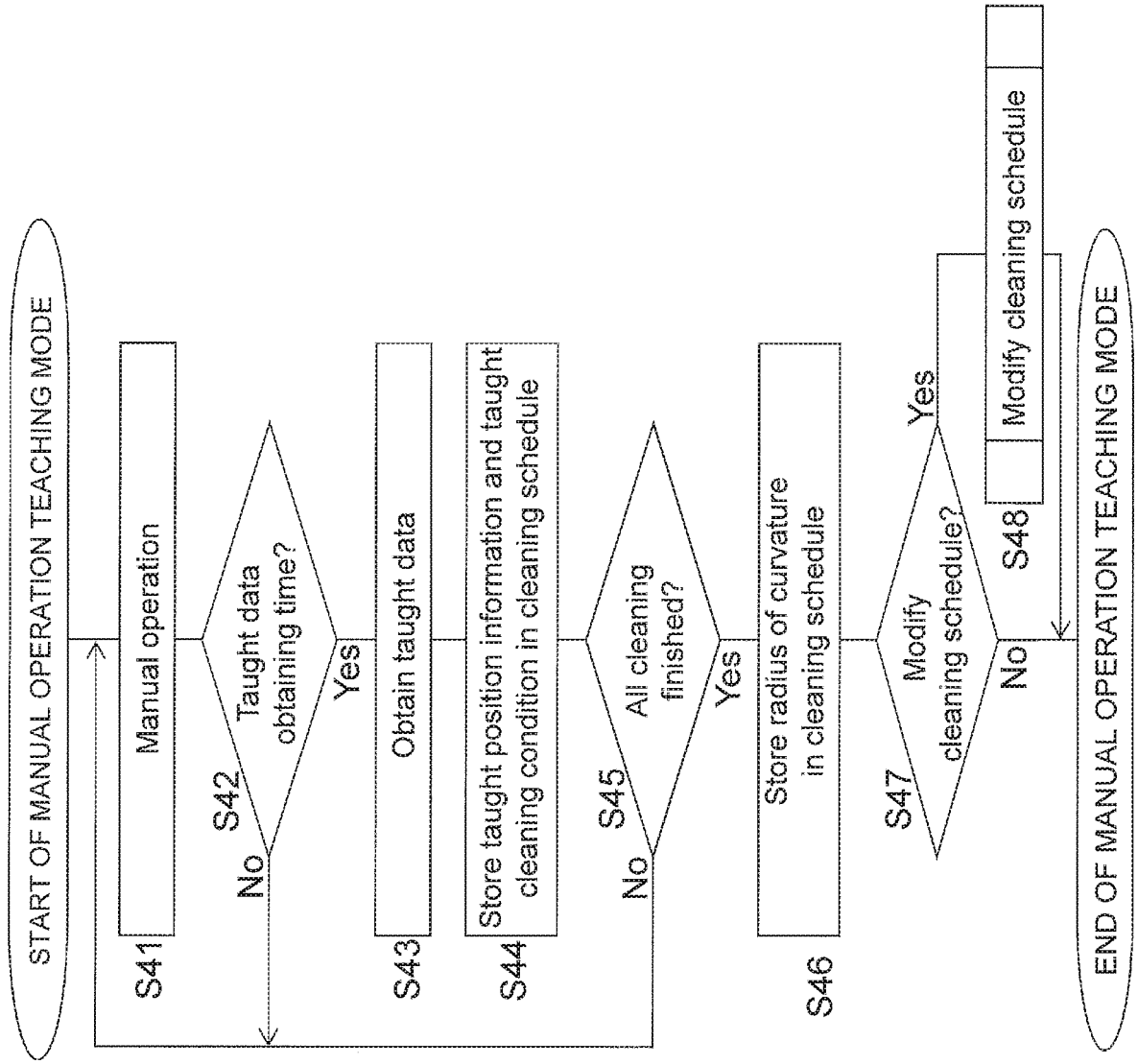
FIG. 9B is a flowchart showing an operation in a manual operation teaching mode.

The operation of the manual operation teaching mode executed in the above-mentioned Step S4 is described below with reference to FIG. 9B. FIG. 9B is a flowchart showing an operation of the manual operation teaching mode.

For example, when the manual operation of the washer 100 is started after the manual operation recording switch 92 is pressed, or when the manual operation recording switch 92 is pressed during the manual operation (Step S41), the teaching of the manual operation is started, and the generation of the cleaning schedule 500 is started.

Specifically, at timing when the manual operation recording switch 92 is pressed (elapsed time: 0), the supply amount S of the washing liquid outputted from the cleaning control unit 51 to the washing liquid supply pump, the suction force P outputted to the suction motor 333, and the cleaning ability W outputted to the cleaning member rotating motor 353 and the cleaning member pressing actuator 357, at this timing, are inputted to the taught data obtaining unit 551 as the taught cleaning condition at the elapsed time of 0.

In addition, the position estimating unit 5555 is instructed to estimate a position of the washer 100 at the elapsed time of 0, and the estimated position information is inputted as the taught position information.

The taught position information and the taught cleaning condition at the elapsed time of 0 are inputted to the cleaning schedule generation unit 553 from the taught data obtaining unit 551. The taught position information and the taught cleaning condition are associated with the elapsed time of 0 and stored in the storage unit 57 as the cleaning schedule 500.

After that, the taught data obtaining unit 551 monitors elapsed time determined by the elapsed time determining unit 5557. If the elapsed time is the taught data obtaining time (in the case of "Yes" in Step S42), the taught data obtaining unit 551 receives a position at the taught data obtaining time as the taught position information from the position estimating unit 5555, and it receives a cleaning condition at the taught data obtaining time as the taught cleaning condition from the cleaning control unit 51 (Step S43). In this way, the taught position information and the taught cleaning condition can be obtained every taught data obtaining time.

The taught data obtaining time described above can be every predetermined time (for example, 500 ms) after the manual operation recording switch 92 is pressed, for example.

The cleaning schedule generation unit 553 associates the taught position information and the taught cleaning condition obtained by the taught data obtaining unit 551 with the taught data obtaining time when they are obtained, and stores them in the cleaning schedule 500 (Step S44).

The Steps S41 to S44 described above are performed repeatedly until the cleaning operation by the operator is finished (until becoming "Yes" in Step S45), and hence the taught position information and the taught cleaning condition from the start to the end of the cleaning operation by the operator can be stored as the cleaning schedule 500.

The end of the cleaning operation (storing thereof) can be instructed by pressing the manual operation recording switch 92 during the execution of the manual operation teaching mode. In another preferred embodiment, it may be possible that the end of the cleaning operation (storing thereof) can be instructed by an emergency stop instruction such as an emergency stop button.

In this preferred embodiment, the cleaning schedule generation unit 553 further calculates a radius of curvature p at each point that the washer 100 has passed and stores the same in the cleaning schedule 500 (Step S46).

Specifically, the cleaning schedule generation unit 553 calculates the radius of curvature p that is, for example, a radius ("R" in the following equation) of a circle (defined by $(x-a)^2+(y-b)^2=R^2$, for example), which passes a target position to calculate the radius of curvature $\rho$, a position that was reached by the washer 100 in the past and is separated from the target position by a predetermined distance, and a position that will be reached by the washer 100 in the future and is separated from the target position by a predetermined distance, in the cleaning schedule 500.

By performing the Steps S41 to S46 described above, the cleaning schedule 500 as illustrated in FIG. 10 is generated. FIG. 10 is a diagram illustrating an example of the cleaning schedule.

Figure 11:
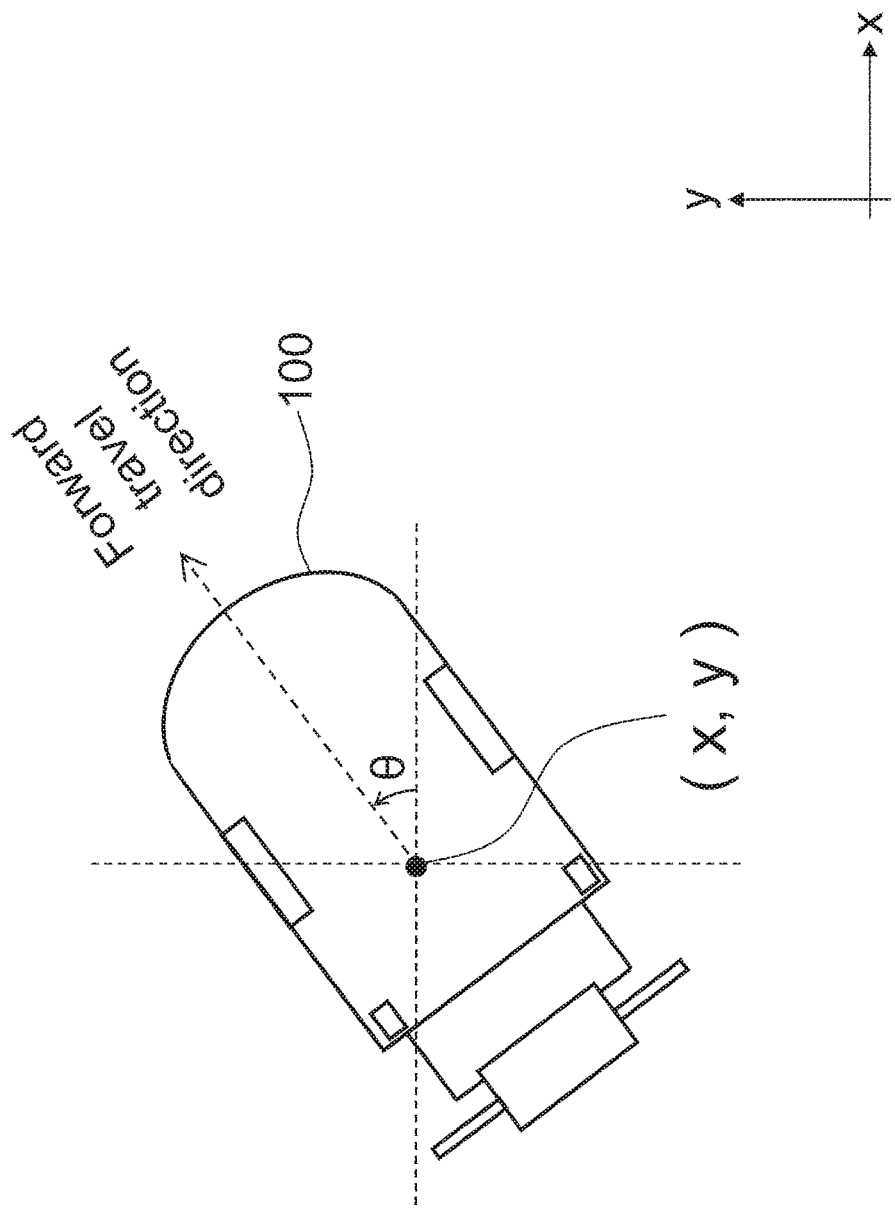
FIG. 11 illustrates an example of a coordinate system in which position information is defined.

The cleaning schedule illustrated in FIG. 10 is defined in the x-y coordinate system as illustrated in FIG. 11. Specifically, the x-axis is defined as the horizontal direction in FIG. 11, while the y-axis is defined as the vertical direction. In addition, an angle $\theta$ is defined as an increasing angle in a counterclockwise direction from the x-axis. The x-axis is defined as an angle of 0. In this coordinate system, an angle between the x-axis and the front and rear direction (straight moving direction) of the washer 100 is defined as the "direction" of the washer 100. FIG. 11 illustrates an example of the coordinate system in which the position information is defined.

In the cleaning schedule 500 illustrated in FIG. 10, $T_0$, $T_1$, ... $T_n$ are the taught data obtaining time. Coordinates $(x_0, y_0, \theta_0)$, $(x_1, y_1, \theta_1)$, ... $(x_n, y_n, \theta_n)$ are the taught position information at the corresponding taught data obtaining time. Coordinates $(x_0, y_0)$, $(x_1, y_1)$, ... $(x_n, y_n)$ are the position information of the washer 100 (coordinate values) in the x-y coordinate system at the corresponding taught data obtaining time, and $\theta_0$, $\theta_1$, ... $\theta_n$ are the angle of the directions of the washer 100 at the corresponding taught data obtaining time.

In the cleaning schedule 500, $S_0$, $S_1$, ... $S_n$ are the supply amounts of the washing liquid at the corresponding taught data obtaining time. Symbols $W_0$, $W_1$, ... $W_n$ are the cleaning abilities for the floor surface F at the corresponding taught data obtaining time. Symbols $P_0$, $P_1$, ... $P_n$ are the suction forces of the suction port O2 at the corresponding taught data obtaining time. Symbols $\rho_1, \rho_2, \ldots \rho_n$ are the radii of curvature of the movement track at the corresponding taught data obtaining time.

After generating the cleaning schedule 500 as described above, the control unit 5 checks whether or not the function of modifying the generated cleaning schedule 500 is enabled in various settings. If the function is enabled, (in the case of "Yes" in Step S47), the control unit 5 instructs the cleaning schedule modifying unit 557 to modify the cleaning schedule 500 (Step S48).

The details of the modification of the cleaning schedule 500 performed in Step S48 will be described later.

In contrast, if the function of modifying the cleaning schedule 500 is disabled (in the case of "No" in Step S47), the control unit 5 maintains the generated cleaning schedule 500 as it is, and the manual operation teaching mode is finished.

According to the steps as described above, the positions, the taught cleaning condition, and the radii of curvature obtained at the taught data obtaining time points can be taught to the washer 100 as the cleaning schedule 500.

Figure 12:
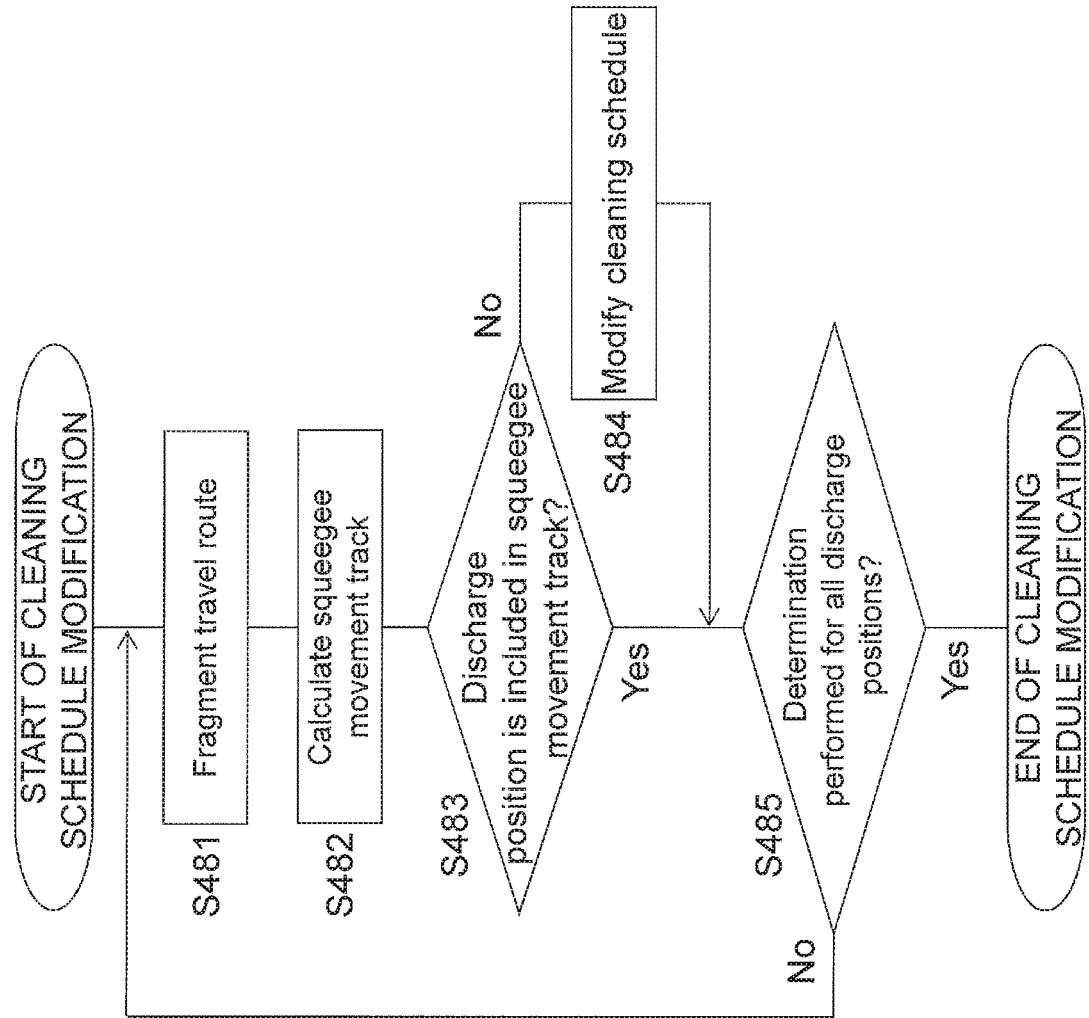
FIG. 12 is a flowchart showing a cleaning schedule modification process.

The modification process of the cleaning schedule 500 performed in Step S48 as described above is described with reference to FIG. 12. FIG. 12 is a flowchart showing the modification process of the cleaning schedule.

The modification of the cleaning schedule 500 is performed in the case where the washing liquid discharged from the washing liquid discharge port 31 cannot be collected by the squeegee 33, i.e., the case where there is the possibility that the washing liquid remains on the floor surface F if the current cleaning schedule 500 is faithfully performed.

Therefore, the cleaning schedule modifying unit 557 first determines whether or not all the washing liquid discharged to the floor surface F can be collected by the squeegee 33 if the cleaning schedule 500 that is currently stored in the storage unit 57 is reproduced. In the following description, the determination is described with an example of determining whether or not the washing liquid discharged at the taught data obtaining time $T_m$ can be collected by the squeegee 33.

The cleaning schedule modifying unit 557 in this preferred embodiment determines whether or not the washing liquid discharged at the taught data obtaining time $T_m$ can be collected in the period from the taught data obtaining time $T_m$ to the taught data obtaining time $T_{m+q}$ (q>0) after a predetermined elapsed time.

Therefore, for the determination whether or not the washing liquid can be collected by the squeegee 33, the cleaning schedule modifying unit 557 calculates the movement track along which the squeegee 33 moves when the washer 100 moves during the period from the taught data obtaining time $T_m$ to the taught data obtaining time $T_{m+q}$. After that, it is determined whether or not washing liquid discharged at the taught data obtaining time $T_m$ can be collected, based on whether or not the washing liquid discharged at the taught data obtaining time $T_m$ is included in the movement track. The movement track of the squeegee 33 described above is referred to as a "squeegee movement track" at the taught data obtaining time $T_m$.

Specifically, the calculation of the squeegee movement track at the taught data obtaining time $T_m$ is performed as follows.

First, the cleaning schedule modifying unit 557 fragments the movement track of the squeegee 33, using the position information stored currently in the cleaning schedule 500 (positions of the washer 100 at the taught data obtaining time points) (Step S481).

The squeegee movement track at the taught data obtaining time $T_m$ is the movement track of the squeegee 33 during the period from the taught data obtaining time $T_m$ to the taught data obtaining time $T_{m+q}$. Therefore, the cleaning schedule modifying unit 557 fragments the movement track from the position $(x_m, y_m)$ associated with the taught data obtaining time $T_m$ to the position $(x_{m+q}, y_{m+q})$ associated with the taught data obtaining time $T_{m+q}$.

Specifically, for example, the cleaning schedule modifying unit 557 first regards an arc that passes the position $(x_m, y_m)$ associated with the taught data obtaining time $T_m$ in the cleaning schedule 500 and has a radius of curvature $\rho_m$ associated with the taught data obtaining time $T_m$, as the movement track of the washer 100 from the taught data obtaining time $T_m$ to the taught data obtaining time $T_{m+q}$. Then, a plurality of positions are defined on the movement track of the washer 100. This process is performed as follows.

First, a central angle of the movement track (bowstring) when the washer 100 moves between the two positions with the radius of curvature $\rho_m$ is calculated. The central angle can be calculated, for example, as a change in the angle $(\theta_{m+q}-\theta_m)$ of the direction of the washer 100 from the taught data obtaining time $T_m$ to the taught data obtaining time $T_{m+q}$.

Next, the central angle of the route (bowstring) when the washer 100 moves from the position $(x_m, y_m)$ to each point defined on the movement track with the radius of curvature $\rho_m$ is calculated. For example, if v+1 positions are defined, a change in the angle of the direction at the h-th point after the fragmentation can be calculated as $\{(\theta_{m+q}-\theta_m)/v\}*h$ (h=0, 1, 2, ... v).

After that, considering characteristics or the like of the traveling unit 1 that is a two-wheel differential type, the coordinates $(x_m(h), y_m(h))$ and the angle $\theta_m(h)$ of the direction of the h-th position defined on the movement track can be calculated as follows.

$$\theta_m(h)=\theta_m+\{(\theta_{m+q}-\theta_m)/v\}*h$$

$$x_m(h)=x_m+\rho_m*(\theta_m(h)-\theta_m)*\cos[\theta_m+\{(\theta_m(h)-\theta_m)/2\}]$$

$$y_m(h)=y_m+\rho_m*(\theta_m(h)-\theta_m)*\sin[\theta_m+\{(\theta_m(h)-\theta_m)/2\}]$$

A degree of the fragmentation of the movement track from the position $(x_m, y_m)$ to the position $(x_{m+q}, y_{m+q})$ (the number of passing points defined at the continuous two positions in the fragmentation process) can be appropriately determined in consideration with the maximum length of the taught data obtaining time, and/or operation processing ability of the cleaning schedule modifying unit 557.

Further, if the radius of curvature p is largely changed in the period from the taught data obtaining time $T_m$ to the taught data obtaining time $T_{m+q}$, the fragmentation may be performed before and after the large change in the radius of curvature.

After fragmenting the movement track of the washer 100, the cleaning schedule modifying unit 557 calculates the squeegee movement track that is formed when the washer 100 passes the passing points defined in the fragmentation process (Step S482).

Specifically, the cleaning schedule modifying unit 557 first allocates the virtual model of the washer 100 at the passing points defined in the fragmentation process. Then, the cleaning schedule modifying unit 557 calculates the position of the joint J and the (center) position of the squeegee 33 at each passing point, using the virtual model illustrated in FIG. 5. The calculation is performed as follows.

Figure 13:
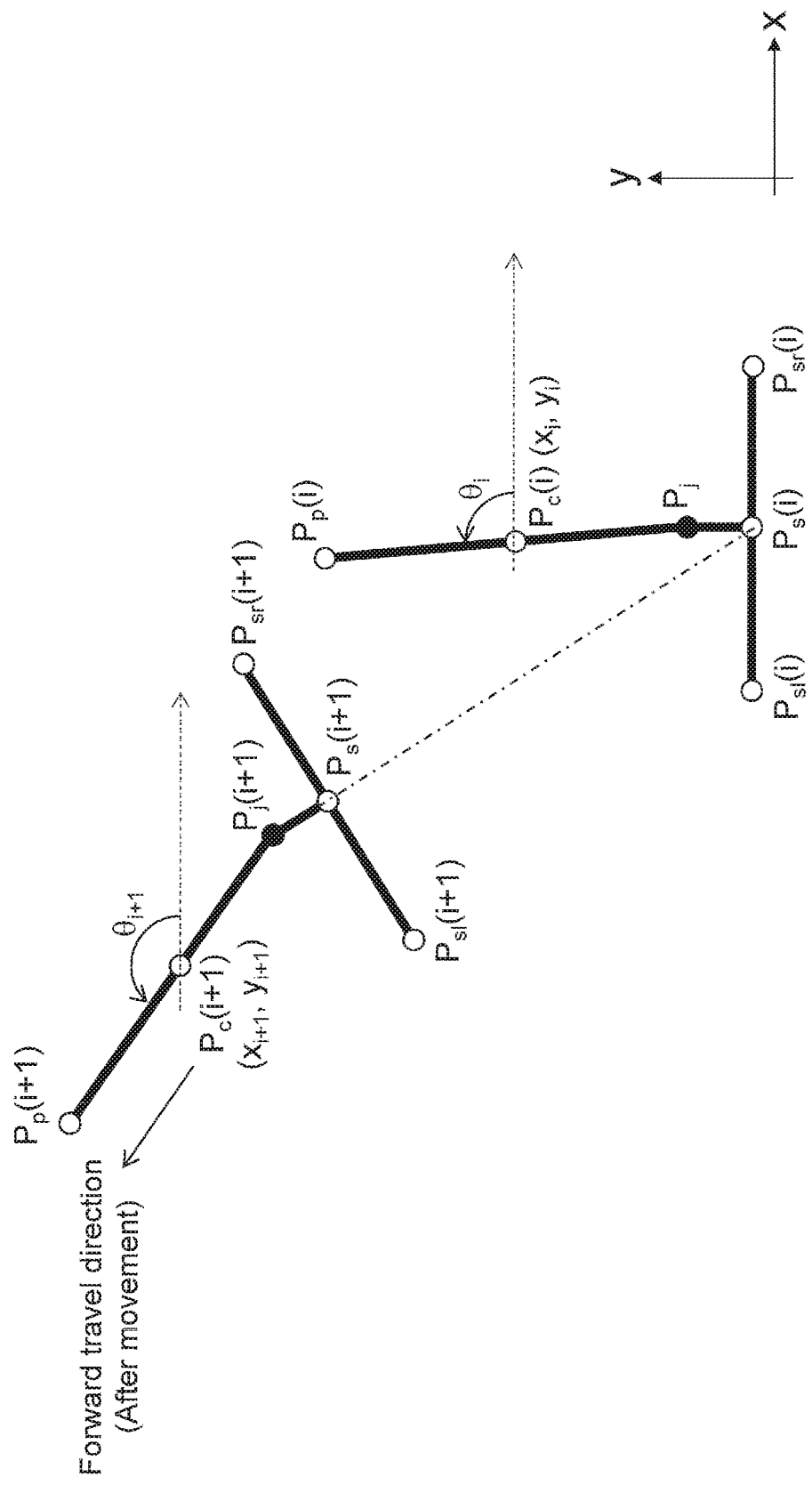
FIG. 13 is a diagram illustrating an example of the virtual model of the autonomously traveling floor washer before and after movement.

For example, the virtual model of the washer 100 indicating the movement from the position $(x_i, y_i)$ and the angle $\theta i$ of the direction after the fragmentation to the position $(x_{i+1}, y_{i+1})$ and the angle $\theta_{i+1}$ of the direction after the fragmentation is illustrated in FIG. 13. FIG. 13 is a diagram illustrating an example of the virtual model of the washer before and after the movement.

In the above case, the position $P_s(i+1)$ of the suction port O2 after the movement, i.e. the center position $P_s(i+1)$ of the squeegee 33 after the movement can be calculated, for example, as coordinate values of the point that is on a line segment connecting the position $P_j(i+1)$ of the joint J after the movement and the position $P_s(i)$ of the suction port O2 before the movement (a line segment shown by a dot-dashed line in FIG. 13), with a distance from the joint J (position $P_j(i+1)$) after the movement being the above-mentioned $L_{js}$ (the length from the joint J to the suction port O2). Note that the x coordinate value of the position $P_j(i+1)$ of the joint J after the movement can be calculated as $x_{i+1} - L_{cj}*\cos \theta_{i+1}$, while the y coordinate value thereof can be calculated as $y_{i+1} - L_{cj}*\sin \theta_{i+1}$.

As described above, a rotation angle of the joint J is restricted within the range of $\pm\Theta/2$ in the front and rear direction of the washer 100. Therefore, after calculating the center position $P_s(i+1)$ of the squeegee 33 after the movement, the cleaning schedule generation unit 553 calculates an acute angle between the straight line connecting the position $P_j(i+1)$ of the joint J and the center position $P_s(i+1)$ of the squeegee 33 after the movement and the forward travel direction of the washer 100 after the movement (the straight line connecting the point $P_p(i+1)$ and the point $P_j(i+1)$). If the absolute value of this angle is larger than $\Theta/2$, the cleaning schedule generation unit 553 sets the absolute value of the angle between the straight line connecting the position $P_j(i+1)$ of the joint J and the center position $P_s(i+1)$ of the squeegee 33 after the movement and the forward travel direction of the washer 100 after the movement to $\Theta/2$, and recalculates the coordinate value of the center position $P_s(i+1)$ of the squeegee 33 after the movement.

Figure 14A:
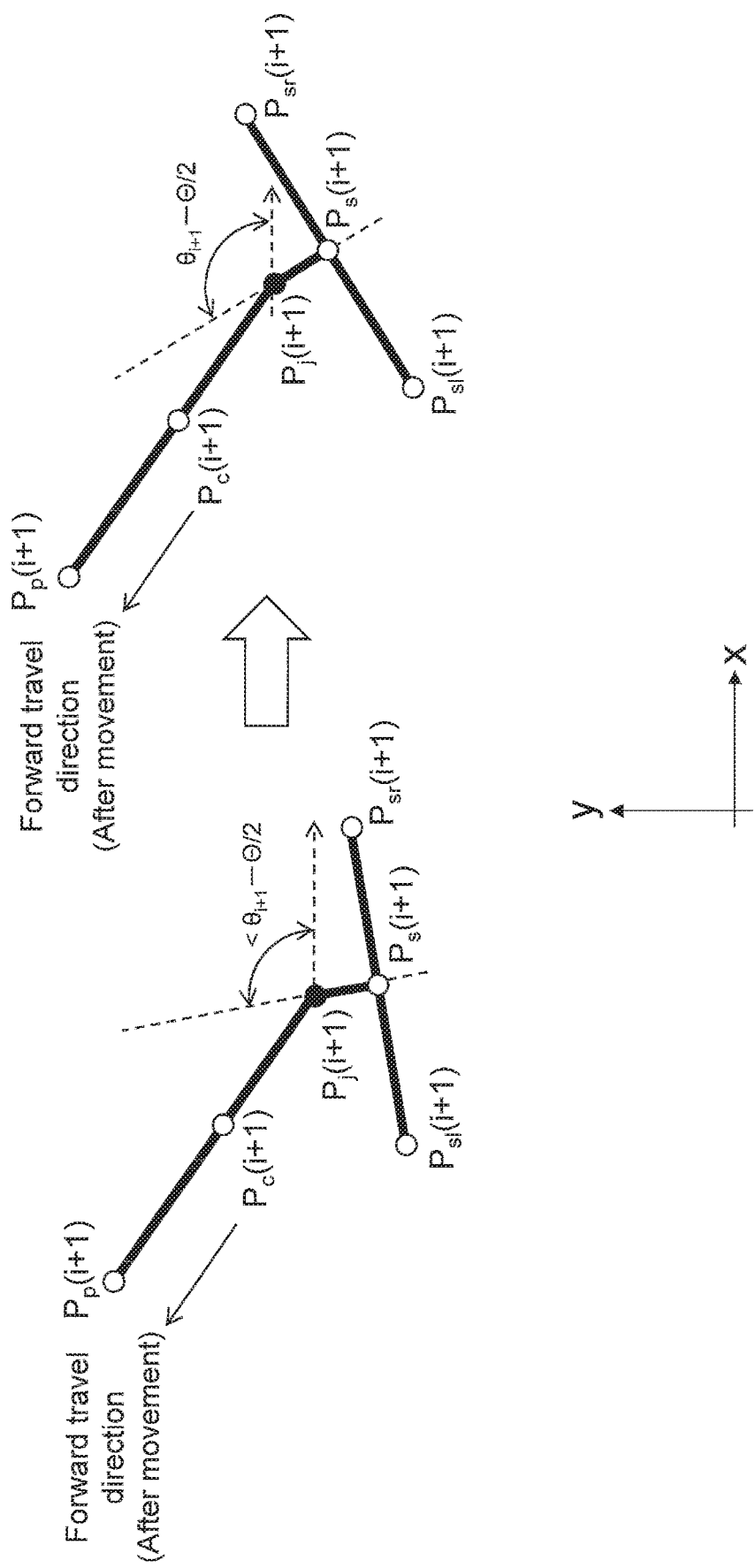
FIG. 14A is a diagram illustrating schematically an example of a process when it is determined that a joint is rotated by a predetermined or larger angle (Case 1).

Specifically, as illustrated in FIG. 14A, in the x-y coordinate system, if the angle between the straight line connecting the position $P_j(i+1)$ of the joint J and the center position $P_s(i+1)$ of the squeegee 33 after the movement and the x-axis (the positive direction thereof) is smaller than $\theta_{i+1} - \Theta/2$, the center position $P_s(i+1)$ of the squeegee 33 after the movement is calculated by setting the above angle to $\theta_{i+1} - \Theta/2$.

Figure 14B:
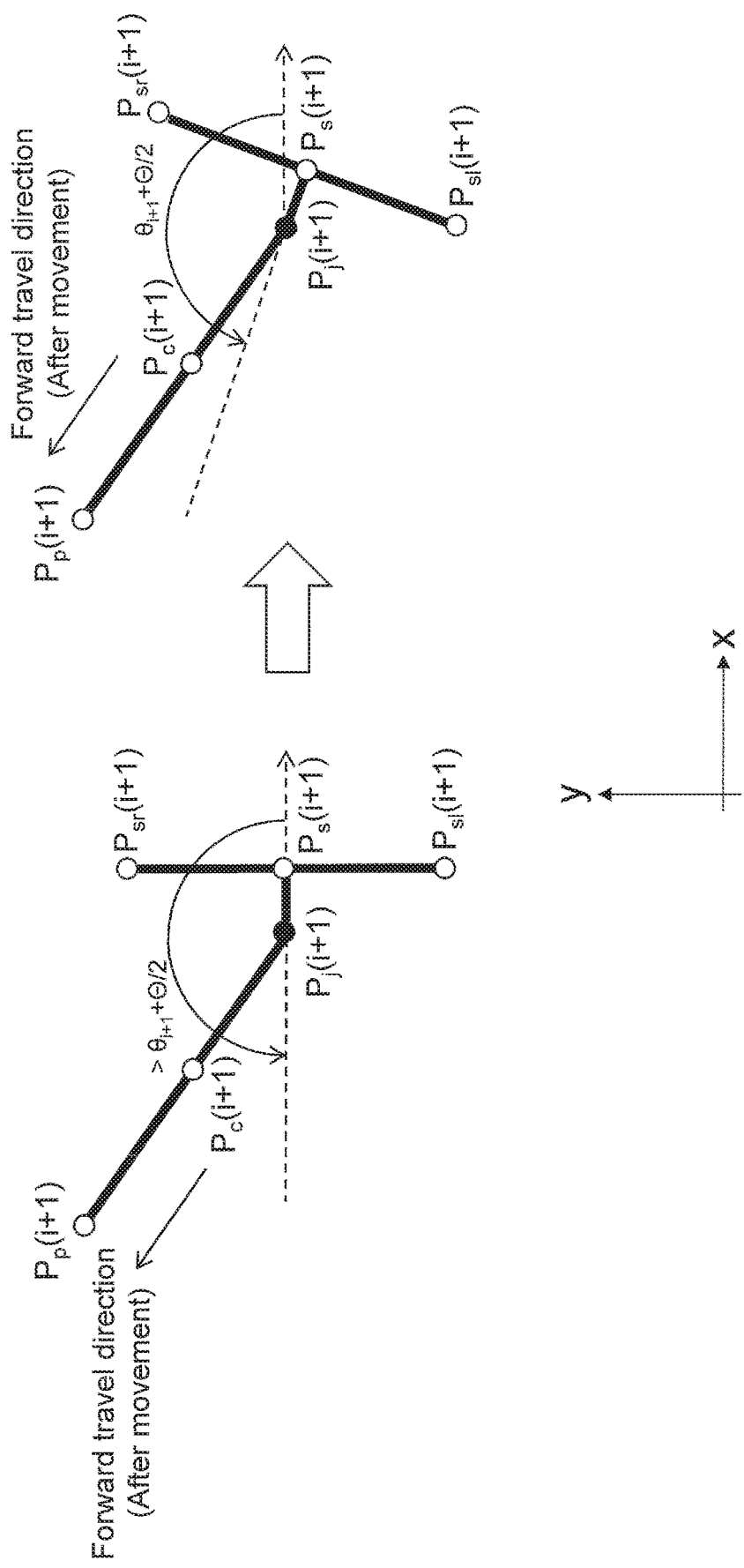
FIG. 14B is a diagram illustrating schematically an example of a process when it is determined that the joint is rotated by a predetermined or larger angle (Case 2).

In contrast, as illustrated in FIG. 14B, if the angle between the straight line connecting the position $P_j(i+1)$ of the joint J and the center position $P_s(i+1)$ of the squeegee 33 after the movement and the x-axis (the positive direction thereof) is larger than $\theta_{i+1} + \Theta/2$, the center position $P_s(i+1)$ of the squeegee 33 after the movement is recalculated by setting the above angle to $f_{i+1} + \Theta/2$.

In addition, if the movement of the washer 100 from the position $(xi, yi)$ and the direction with the angle $\theta i$, to the position $(x_{i+1}, y_{i+1})$ and the direction with the angle $\theta_{i+1}$ is very small (i.e. if the absolute values of and $x_{i+1} - xi$, $y_{i+1} - yi$, and $\theta_{i+1} - \theta i$ are a predetermined value or less), the cleaning schedule generation unit 553 determines that the angle of the joint J is not changed before and after the movement.

In this way, the fact that the angle of the squeegee 33 (angle of the joint J) does not change rapidly when the movement amount of the washer 100 is small, can be considered in calculating the position of the squeegee 33.

The cleaning schedule modifying unit 557 then calculates right end position $P_{sr}'$ and the left end position $P_{sl}'$ of the squeegee 33 at each passing point. The calculation is performed as follows, for example.

It is assumed, for example, that a fragmented route having $v+1$ passing points is generated for the route along which the washer 100 has passed during the period from the taught data obtaining time $T_m$ to the taught data obtaining time $T_{m+q}$, and the positions of the joints J and the center positions of the squeegee 33 are calculated for the passing points of the fragmented route as $(P_j(0), P_s(0))$, $(P_j(1), P_s(1))$, $(P_k(2), P_s(2))$, $(P_j(3), P_s(3))$, ... $(P_j(v), P_s(v))$ by repeating the above-described method.

First, the cleaning schedule modifying unit 557 calculates the straight line that is perpendicular to the line segment $P_j(0)P_s(0)$ connecting the position $P_j(0)$ of the joint J calculated for the first passing point and the center position $P_s(0)$ of the squeegee 33, and passes the position $P_s(0)$, for example. The cleaning schedule modifying unit 557 further calculates two points that are on the straight line and have a distance of w/2 (w is the width of the squeegee 33) from the position $P_s(0)$ as the right end position $P_{sr}(0)$ and the left end position $P_{sl}(0)$ of the squeegee 33 at each passing point.

Figure 15:
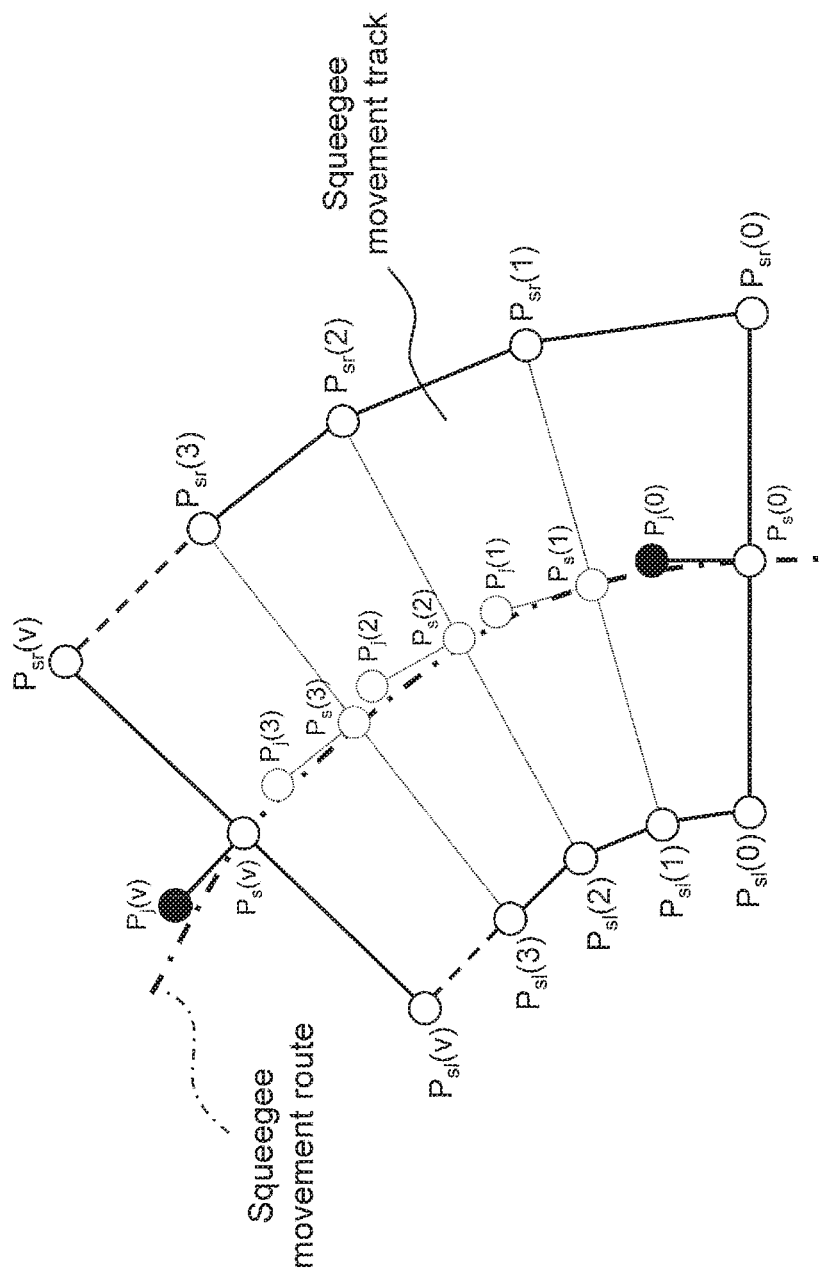
FIG. 15 is a diagram illustrating an example of a squeegee movement track.

After calculating the right end position and the left end position of the squeegee 33 for every passing point by repeating the above calculation, the cleaning schedule modifying unit 557 connects, as illustrated in FIG. 15, the left end position $P_{sl}(0)$ of the squeegee 33 calculated for the first passing point (at the taught data obtaining time $T_m$), the left end positions $P_{sl}(1)$, $P_{sl}(2)$, $P_{sl}(3)$, ... $P_{sl}(v-1)$ of the squeegee 33 calculated for the intermediate passing points, the left end position $P_{sl}(v)$ of the squeegee 33 calculated for the last passing point (at the taught data obtaining time $T_{m+q}$), the right end position $P_{sr}(v)$ of the squeegee 33 calculated for the last passing point (at the taught data obtaining time $T_{m+q}$), the right end position $P_{sr}(1)$, $P_{sr}(2)$, $P_{sr}(3)$, ... $P_{sr}(v-1)$ of the squeegee 33 calculated for the intermediate passing points, and the right end position $P_{sr}(0)$ of the squeegee calculated for the first passing point (at the taught data obtaining time $T_m$). In this way, the squeegee movement track between the taught data obtaining time $T_m$ and the taught data obtaining time $T_{m+q}$ can be calculated. FIG. 15 is a diagram illustrating an example of the squeegee movement track.

As described above, by defining a plurality of virtual positions and widths of the squeegee 33 that are assumed between the taught data obtaining time $T_m$ and the taught data obtaining time $T_{m+q}$, in other words, by fragmenting the movement track of the washer 100 (squeegee 33) when calculating the squeegee movement track, the squeegee movement track indicating the more practical movement track of the squeegee 33 can be calculated. Thus, it is possible to determine more accurately whether or not a washing liquid discharge position is included in the squeegee movement track.

In addition, since the squeegee movement track is calculated within the range from the taught data obtaining time $T_m$ to the taught data obtaining time $T_{m+q}$ after a predetermined elapsed time, it is possible to reduce or prevent inappropriate cleaning such that the washing liquid discharged at a certain elapsed time remains on the floor surface F for a long period, when the autonomous cleaning mode is executed.

After calculating the squeegee movement track, the cleaning schedule modifying unit 557 determines whether or not the washing liquid discharged to the floor surface F at the taught data obtaining time $T_m$ can be collected by the squeegee 33. Specifically, the cleaning schedule modifying unit 557 determines whether or not the washing liquid discharge position at the taught data obtaining time $T_m$ is included in the calculated squeegee movement track (Step S483).

In Step S483, the cleaning schedule modifying unit 557 first calculates the washing liquid discharge position $P_w$ at the taught data obtaining time $T_m$ using the virtual model as illustrated in FIG. 5.

The x coordinate value of the position $P_p(m)$ of the washing liquid discharge port 31 at the taught data obtaining time $T_m$ can be calculated using the virtual model as $x_m + L_{pc} * \cos \theta_m$. On the other hand, the y coordinate value can be calculated as $y_m + L_{pc} * \sin \theta_m$. The coordinate values of the washing liquid discharge position $P_w$ can be calculated, for example, as coordinate values of an intersection between a circle and a line segment, the circle having the center at the position $P_p(m)$ of the washing liquid discharge port 31 at the taught data obtaining time $T_m$ and having a diameter slightly smaller than the cleaning member 35 (a circle in which a polygon defining the discharge position $P_w$ is inscribed), and the line segment extending from the position $P_p(m)$ and having a gradient of $\tan(\theta_m + (u-1)*360/N)$.

N in the above expression represents the number of vertexes of the polygon for defining the washing liquid discharge position $P_w$, and it is 8 in this preferred embodiment, for example. Symbol u represents a positive integer from 1 to N.

Next, the cleaning schedule modifying unit 557 determines whether or not all the washing liquid discharge positions $P_w$ calculated as described above are included in the squeegee movement track calculated in Step S482.

Whether or not the washing liquid discharge position $P_w$ is included in the squeegee movement track is determined as follows. A cross product between a vector from one of the vertexes of the squeegee movement track (a vertex as an origin of the vector) to another vertex and a vector from the vertex as the origin to the discharge position $P_w$ is calculated, while changing the vertex as the origin. If a positive or negative sign of the cross product does not change when the vertex as the origin is changed, it is determined that the washing liquid discharge position $P_w$ is included in the squeegee movement track.

Figure 16:
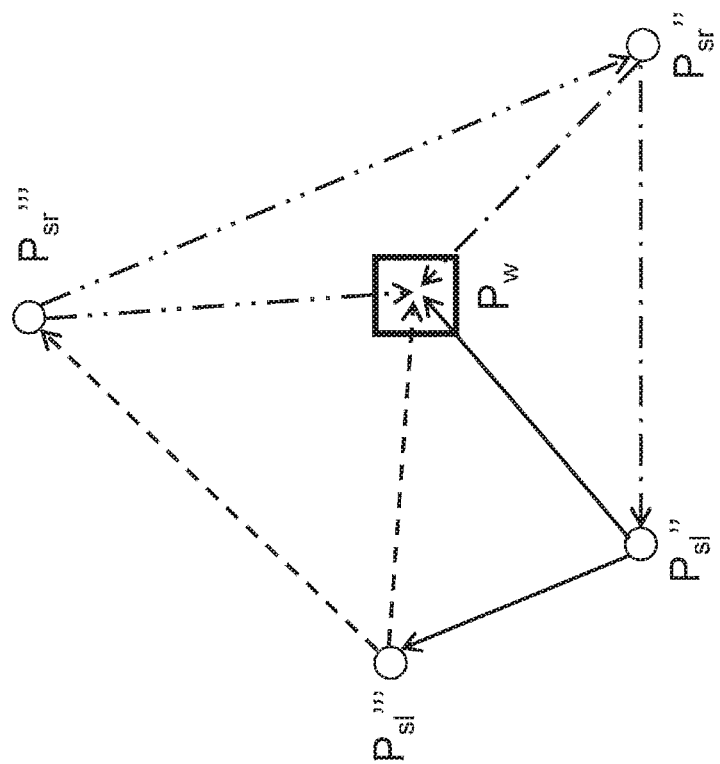
FIG. 16 is a diagram illustrating schematically a method of determining whether or not a washing liquid discharge position is included in the squeegee movement track.

The method of determining whether or not the washing liquid discharge position $P_w$ is included in the squeegee movement track using the calculation result of the cross product is described more specifically with an example case in which the squeegee movement track is a quadrangle as illustrated in FIG. 16, for simple description. FIG. 16 is a diagram illustrating schematically the method of determining whether or not the washing liquid discharge position is included in the squeegee movement track.

When the positions $P_{sl}"$ and $P_{sr}"$ of both ends of the squeegee 33 move to $P_{sl}'''$ and $P_{sr}'''$, respectively, due to the movement of the washer 100, the quadrangle $P_{sl}"P_{sl}'''P_{sr}'''P_{sr}"$ illustrated in FIG. 16 is formed as the squeegee movement track.

In the calculation of the cross product, a positive or negative sign thereof (which is changed by definition of the coordinate system) is determined based on a rotation direction of one of the two vectors of the cross product when it is rotated to be parallel to the other vector.

Therefore, when calculating the cross product between the vector from vertex as an origin of the squeegee movement track to another vertex and the vector from the vertex as the origin to the discharge position $P_w$, in the expression of A×B of the cross product between the two vectors A and B, A represents the vector from the vertex as the origin to the discharge position $P_w$, while B represents the vector from the vertex as the origin to another vertex of the squeegee movement track, for example.

In the squeegee movement track illustrated in FIG. 16, if the vertex $P_{sl}"$ is the origin, for example, the cleaning schedule modifying unit 557 calculates the cross product $(P_{sl}"P_w) \times (P_{sl}"P_{sl}''')$ between two vectors illustrated by solid lines in FIG. 16. For the vertex $P_{sl}'''$, the cross product $(P_{sl}'''P_w) \times (P_{sl}'''P_{sr}''')$ between two vectors illustrated by dot lines in FIG. 16 is calculated. For the vertex $P_{sr}'''$, the cross product $(P_{sr}'''P_w) \times (P_{sr}'''P_{sr}")$ between two vectors illustrated by double-dot dashed lines in FIG. 16 is calculated. For the vertex $P_{sr}"$, the cross product $(P_{sr}"P_w) \times (P_{sr}"P_{sl}")$ between two vectors illustrated by dot-dashed lines in FIG. 16 is calculated.

The cleaning schedule modifying unit 557 determines that the washing liquid discharge position $P_w$ is included in the squeegee movement track if all the four cross products calculated as described above have the same positive sign or negative sign.

In another preferred embodiment of the present invention, when calculating the cross product between two vectors described above, there is a possibility, for example, that the vectors may cross each other, or the squeegee movement track may have a concave shape, depending on the method of defining the vectors. In this case, it may be possible to define a triangle included in the squeegee movement track and to determine whether or not the discharge position $P_w$ is included in the triangle, for example.

In still another preferred embodiment of the present invention, the cleaning schedule modifying unit 557 may calculate the squeegee movement track considering the suction force P of the suction port O2 associated with each taught data obtaining time. For example, if taught data obtaining time at which the suction force is set to zero exists among the suction forces $P_m$ to $P_{m+q}$ at the taught data obtaining time points $T_m$ to $T_{m+q}$, even if the discharge position $P_w$ is included in the squeegee movement track from the taught data obtaining time to the next taught data obtaining time, it may be determined that the discharge position $P_w$ is not included in the squeegee movement track.

If it is determined that the washing liquid discharge position $P_w$ is not included in the squeegee movement track as described above (in the case of "No" in Step S483), the cleaning schedule modifying unit 557 modifies the cleaning schedule 500 so that all the stored washing liquid discharge positions are included in the squeegee movement track (Step S484).

Specifically, the cleaning schedule modifying unit 557 sets the supply amount $S_m$ of the washing liquid associated with the taught data obtaining time $T_m$ at which the discharge position $P_w$ is not included in the squeegee movement track to zero. In other words, the washing liquid is not supplied at the taught data obtaining time $T_m$.

In this way, it is possible to generate a new cleaning schedule 500 in which the washing liquid is supplied only to the washing liquid discharge position $P_w$ included in the squeegee movement track.

In another preferred embodiment of the present invention, the cleaning schedule modifying unit 557 may modify the cleaning schedule 500 so as to increase the suction force (of the suction port O2) for the washing liquid at the washing liquid discharge position $P_w$ that is not included in the squeegee movement track.

Specifically, for example, the cleaning schedule modifying unit 557 sets a size of the polygon formed at the discharge position $P_w$ in the virtual model of FIG. 5 to be a slightly smaller than the size in the virtual model, and if all the discharge positions at vertexes of this smaller polygon are included in the calculated squeegee movement track, the cleaning schedule modifying unit 557 modifies the cleaning schedule 500 so as to increase the suction force of the suction port O2. In this way, the washer 100 can generate the cleaning schedule 500 in which the washing liquid can be collected as much as possible and can autonomously perform the cleaning operation with high cleaning efficiency.

In still another preferred embodiment of the present invention, if the washing liquid discharge position $P_w$ is included in the squeegee movement track, the cleaning schedule modifying unit 557 may adjust the suction force $P_m$ so that the discharged washing liquid can be collected, and/or may adjust the supply amount $S_m$ of the washing liquid to a value such that the washing liquid can be collected by the set suction force $P_m$. The amount (volume) of the discharged washing liquid can be calculated from the supply amount $S_m$ of the washing liquid and the moving speed of the washer 100, for example.

In another preferred embodiment of the present invention, the cleaning schedule modifying unit 557 may modify other inappropriate taught cleaning conditions stored in the cleaning schedule 500, not just in the case where the washing liquid discharge position $P_w$ is not included in the squeegee movement track.

Specifically, for example, if the washing liquid is supplied at the taught data obtaining time $T_m$, and all the suction forces of the suction port O2 or some suction forces at some timings are zero during the period from the taught data obtaining time $T_m$ to the taught data obtaining time $T_{m+q}$ when the liquid should be collected by the squeegee 33, the cleaning schedule modifying unit 557 may modify the suction force at the taught data obtaining time to a value other than zero, or may modify the supply amount of the washing liquid at the taught data obtaining time to zero.

In this way, for example, if an inappropriate cleaning condition such that the suction by the suction port O2 is not performed despite that the washing liquid was supplied is stored as the taught cleaning condition in the cleaning schedule 500, this inappropriate taught cleaning condition is modified and an appropriate cleaning schedule 500 such that the washing liquid does not remain on the floor surface F can be newly generated.

On the other hand, if it is determined that the washing liquid discharge position $P_w$ is included in the squeegee movement track (in the case of "Yes" in Step S483), the cleaning schedule modifying unit 557 maintains the current cleaning schedule 500 without modifying the taught cleaning condition at the taught data obtaining time $T_m$.

The cleaning schedule modifying unit 557 repeatedly performs the above-mentioned Steps S481 to S484, until whether or not the discharge position $P_w$ is included in the squeegee movement track is determined for all the taught data obtaining time points stored in the cleaning schedule 500 (as long as "No" in Step S485), and then finishes the modification of the cleaning schedule 500.

In this preferred embodiment, as described above, the cleaning schedule modifying unit 557 allocates a plurality of virtual passing points on the route along which the washer 100 has moved between the taught data obtaining time $T_m$ and the taught data obtaining time $T_{m+q}$ (fragmentation), and calculates the squeegee movement track based on the position and width of the squeegee 33 at each virtual passing point including the passing points at the taught data obtaining time $T_m$ and the taught data obtaining time $T_{m+q}$. In this way, the cleaning schedule modifying unit 557 can calculate the squeegee movement track indicating the movement track of the squeegee 33 that is close to the actual movement track.

Figure 17B:
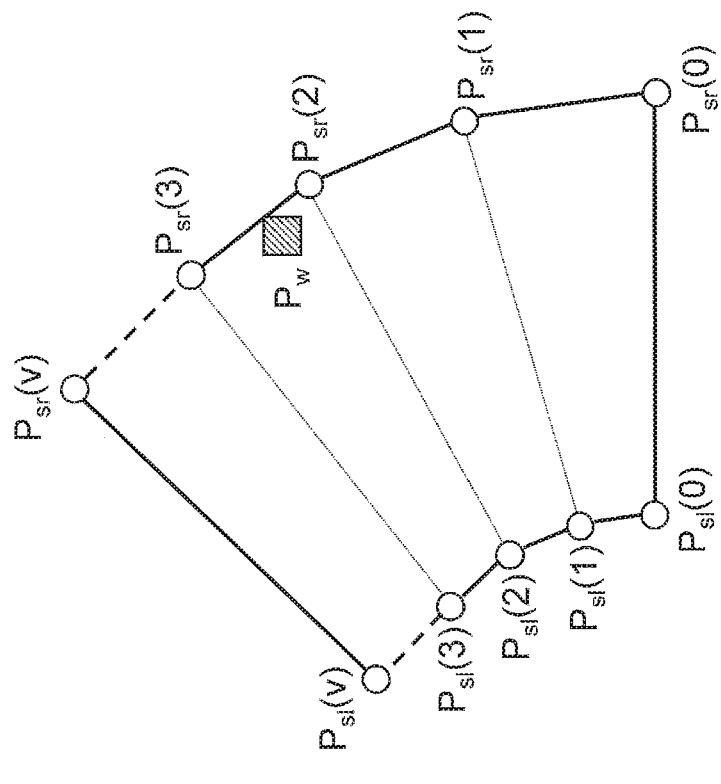
FIG. 17B is a diagram illustrating an example of a case where a discharge position, which is determined to be not included in a squeegee movement track calculated without fragmentation of the movement track, is determined to be included in a squeegee movement track calculated with fragmentation of the movement track.
Figure 17A:
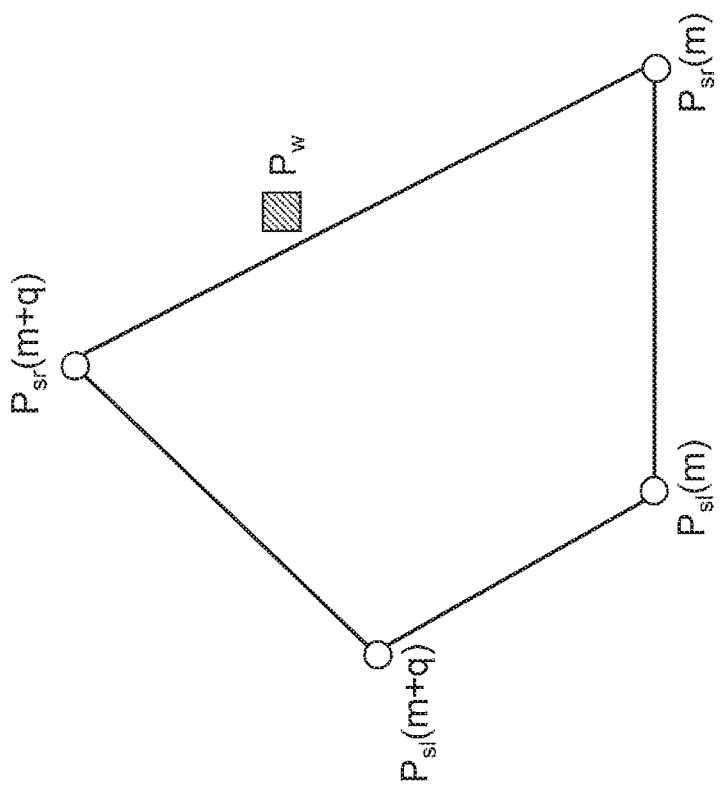
FIG. 17A is a diagram illustrating an example of a relationship between a squeegee movement track and a discharge position in a case where the movement track is not fragmented.

As a result, for example, as illustrated in FIG. 17A, the washing liquid discharge position $P_w$ is determined not to be included in the squeegee movement track when defining the squeegee movement track using only the positions $P_{sl}(m)$, $P_{sr}(m)$, $P_{sl}(m+q)$, and $P_{sr}(m+q)$ and the width w of the squeegee 33 at the taught data obtaining time $T_m$ and the taught data obtaining time $T_{m+q}$, but as illustrated in FIG. 17B, it is possible to accurately determine that the discharge position $P_w$ is included in the squeegee movement track when using the squeegee movement track based on the movement track of the squeegee 33 that is fragmented and calculated to be close to the actual movement track.

FIG. 17A is a diagram illustrating an example of a relationship between a squeegee movement track and a discharge position without the fragmentation of the movement track. FIG. 17B is a diagram illustrating an example of the case in which the discharge position that is determined not to be included in the squeegee movement track calculated without the fragmentation is determined to be included in the squeegee movement track that is calculated using the fragmentation.

Figure 18:
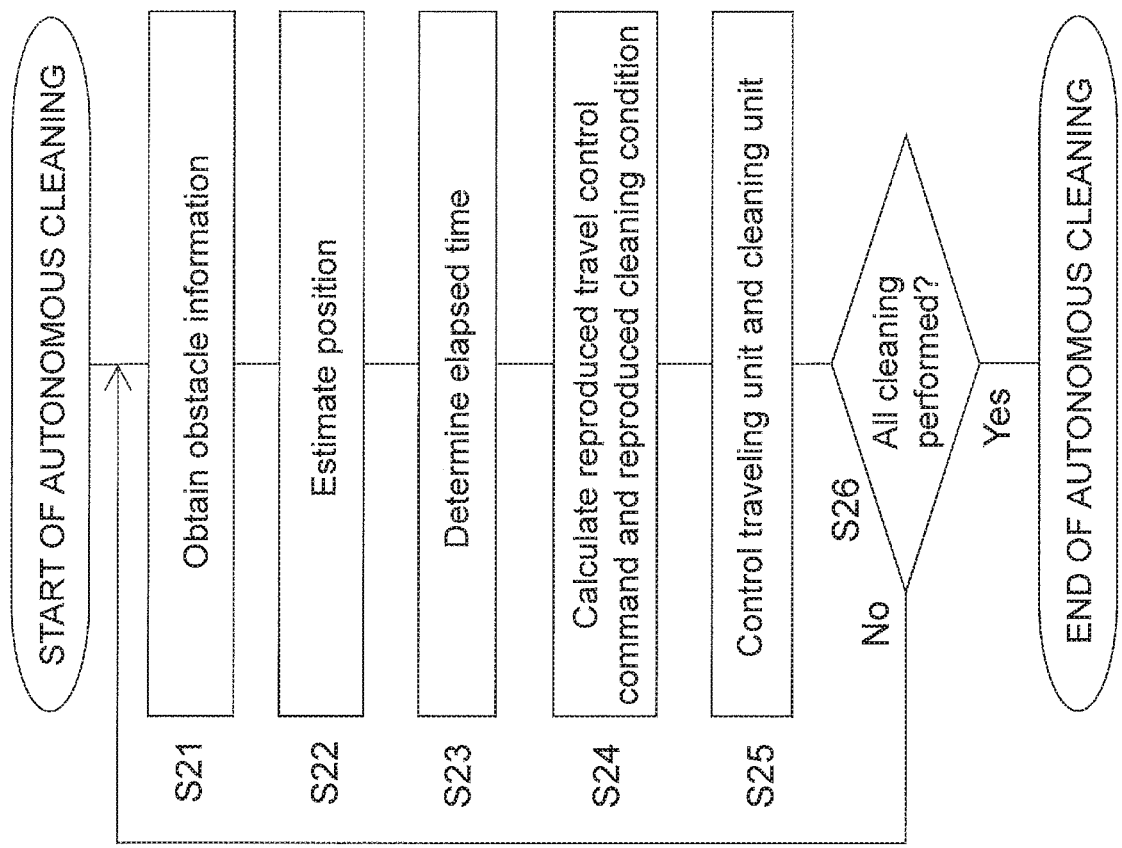
FIG. 18 is a flowchart showing an operation of the autonomously traveling floor washer when an autonomous cleaning mode is executed.

Next, the operation of the washer 100 when executing the autonomous cleaning mode to reproduce the taught cleaning operation, performed in Step S2 of FIG. 9A, is described with reference to FIG. 18. FIG. 18 is a flowchart showing an operation of the washer when executing the autonomous cleaning mode. It is assumed that the cleaning operation has already been performed by an elapsed time $t_{n-1}$ from the start of execution of the autonomous cleaning mode. Symbol n represents the control for the n-th autonomous cleaning.

When the washer 100 starts the autonomous cleaning mode, the SLAM unit 555 first obtains information on a front obstacle and information on a rear obstacle from the front detector 5551a and the rear detector 5551b (Step S21).

The position estimating unit 5555 then estimates a position of the washer 100 in the x-y coordinate system based on the rotation amount of the travel motor 11 measured by the encoder 111, the global map, and the local map obtained based on the information obtained in the above-mentioned Step S21 (Step S22). For example, it is assumed that the position of the washer 100 is estimated as $(x_n', y_n', \theta_n')$ in the x-y coordinate system.

After estimating the position of the washer 100, the elapsed time determining unit 5557 determines the elapsed time $t_n$ from the start of execution of the autonomous cleaning mode (Step S23), and the cleaning reproduction unit 559 calculates the reproduced travel control command and the reproduced cleaning condition at the elapsed time $t_n$ as follows (Step S24).

It is assumed that the elapsed time $t_n$ is determined to be (or closest to) the taught data obtaining time TL. In this case, the cleaning reproduction unit 559 reads out the position information $(x_{L+1}, y_{L+1}, \theta_{L+1})$ associated with the next taught data obtaining time $T_{L+1}$ from the cleaning schedule 500, and calculates the reproduced travel control command at the elapsed time $t_n$ based on the difference $(x_{L+1}-x_n', y_{L+1}-y_n', \theta_{L+1}-\theta_n')$ between the estimated position information and the target position information.

On the other hand, the cleaning reproduction unit 559 reads out the cleaning condition $(S_L, W_L, P_L)$ associated with the taught data obtaining time TL from the cleaning schedule 500, and determines the cleaning condition $(S_L, W_L, P_L)$ as the reproduced cleaning condition at the elapsed time $t_n$.

After calculating the reproduced travel control command and the reproduced cleaning condition, the cleaning reproduction unit 559 outputs the reproduced travel control command to the travel control unit 53 and outputs the reproduced cleaning condition to the cleaning control unit 51 (Step S25).

Since the terminals e and f of the travel switch unit 531 are connected when the autonomous cleaning mode is executed, the reproduced travel control command is transmitted to the motor control unit 533 via the travel switch unit 531. The motor control unit 533 controls the travel motor 11 based on the received reproduced travel control command.

On the other hand, since the terminals b and c are connected in the cleaning switch unit 511, the reproduced cleaning condition is transmitted to the cleaning unit control unit 513 via the cleaning switch unit 511. The cleaning unit control unit 513 controls the cleaning unit 3 based on the received reproduced cleaning condition.

After controlling the traveling unit 1 and the cleaning unit 3 based on the reproduced travel control command and the reproduced cleaning condition, respectively, the cleaning reproduction unit 559 checks whether or not the cleaning operation stored in the cleaning schedule 500 is entirely performed (Step S26).

Whether or not the cleaning operation stored in the cleaning schedule 500 is entirely finished can be checked, for example, by detecting an identifier at the bottom of the cleaning schedule 500 (such as an identifier indicating "End Of File").

As long as it is determined that the cleaning operation stored in the cleaning schedule 500 is not entirely performed (as long as "No" in Step S26), the above-mentioned Steps S21 to S25 are repeatedly performed. When it is determined that the cleaning operation stored in the cleaning schedule 500 is entirely performed (in the case of "Yes" in Step S26), the execution of the reproduced cleaning mode is finished. In this way, the washer 100 faithfully reproduces the cleaning operation stored in the cleaning schedule 500.

In another preferred embodiment of the present invention, the execution of the reproduced cleaning mode may be stopped not only in the case where the cleaning operation stored in the cleaning schedule 500 is entirely performed, but also in the case where an abnormality occurs in the washer 100 or the case where the user instructs to stop the execution of the reproduced cleaning mode, for example.

By performing the above-mentioned Steps S21 to S26, the cleaning reproduction unit 559 calculates the reproduced cleaning condition and the reproduced travel control command based on the cleaning schedule 500 generated by the cleaning schedule generation unit 553, or the cleaning schedule 500 modified by the cleaning schedule modifying unit 557, and outputs them to the cleaning unit 3 and the traveling unit 1, respectively, so that the washer 100 can autonomously perform the cleaning operation.

As described above, in this preferred embodiment, if there is the washing liquid discharge position $P_w$ that is not included in the squeegee movement track in the cleaning schedule 500 generated by the cleaning schedule generation unit 553, the cleaning schedule modifying unit 557 modifies the cleaning schedule 500 and generates the new cleaning schedule 500 such that the stored washing liquid discharge position $P_w$ is included in the squeegee movement track.

In this way, even if the cleaning schedule 500, in which the cleaning operation is performed in such a manner that the used washing liquid remains on the floor surface F, is generated when executing the manual operation teaching mode, it is possible to modify the cleaning schedule 500 so as to autonomously perform an appropriate cleaning operation so that the washing liquid does not remain on the floor surface F in the autonomous cleaning mode.

Other Preferred Embodiments

Although the preferred embodiments of the present invention are described above, the present invention is not limited to the preferred embodiments, and the preferred embodiments can be variously modified within the scope of the invention without deviating therefrom. In particular, the preferred embodiments and variations described in this specification can be arbitrarily combined as necessary. In addition, the contents of the processes and the order of the processes shown in the flowchart in the first preferred embodiment can be modified without deviating from the scope of the present invention. In addition, any of the processes shown in the flowchart can be eliminated as necessary.

In the first preferred embodiment, the cleaning schedule modifying unit 557 is included in the control integration unit 55. This is, however, not a limitation, and the cleaning schedule modifying unit 557 may be another computer system separated from the computer system of the control unit 5.

In this case, the washer 100 may include a port to connect the cleaning schedule modifying unit 557, and/or a communication interface to communicate with the cleaning schedule modifying unit 557.

In this case, the cleaning schedule modifying unit 557 receives the information of the cleaning schedule 500 or the like stored in the storage unit 57 of the washer 100 via the above-mentioned port and/or communication interface, and can modify the cleaning schedule 500 at a place apart from the washer 100. As a result, for example, the modification of the cleaning schedule 500 can be performed also while the washer 100 is in operation.

The position estimating unit 5555 may estimate the position of the washer 100 by position estimation based on laser odometry using only the information obtained from the front detector 5551a and the rear detector 5551b. An iterative closest point (ICP) method or the like can be used as the position estimation method based on the laser odometry, for example.

For example, if there is little slippage between the floor surface F and the main wheel 13, and if the sufficient map information cannot be obtained from the information obtained from the front detector 5551a and the rear detector 5551b, the position estimating unit 5555 may estimate the position of the washer 100 based on only the rotation amount of the travel motor 11.

The calculation of the position of the squeegee 33, which is performed separately from the taught data acquisition described above in the first preferred embodiment, may be performed while obtaining the taught data. For example, in the flowchart of FIG. 9B showing the process in the manual operation teaching mode according to the first preferred embodiment, the calculation of the position of the squeegee 33 may be performed between Step S44 and Step S45.

If the fragmentation of the movement track is not necessarily required, in the case where the taught data obtaining interval is short, and/or the movement track of the washer 100 close to the actual movement track can be expressed by only the position information stored in the cleaning schedule 500, for example, the fragmentation process of the movement track, which is performed for the calculation of the squeegee movement track in the first preferred embodiment, may be omitted. In other words, the process of Step S481 may be omitted in the flowchart of FIG. 12 showing the modification process of the cleaning schedule according to the first preferred embodiment.

In the generation of the cleaning schedule 500, the cleaning schedule generation unit 553 may store the washing liquid discharge position $P_w$, the position of the squeegee 33, and/or the width of the squeegee 33 in association with the taught data obtaining time.

In this case, the cleaning schedule modifying unit 557 performs the calculation of the position of the squeegee 33 and the washing liquid discharge position $P_w$ at each passing point indicated in the cleaning schedule 500 after storing the radius of curvature p in the cleaning schedule 500 (after performing Step S46).

The control unit 5 may evaluate the cleaning operation by the operator when the cleaning schedule 500 is generated, based on how much the cleaning schedule modifying unit 557 has modified the cleaning schedule 500 generated by the cleaning schedule generation unit 553 (for example, the number of modified points). The control unit 5 may display the result of the evaluation of the cleaning operation on the display 97 after the modification of the cleaning schedule 500.

The cleaning schedule modifying unit 557 can perform the determination whether or not the washing liquid discharge position $P_w$ is included in the squeegee movement track by the method other than the method of calculating the cross product between two vectors generated based on the vertexes of the squeegee movement track and the discharge position $P_w$. Specifically, for example, it is possible to use an algorithm to determine whether or not an area (object) is included in another area, such as a "collision detection" algorithm that is used in a computer game.

Preferred embodiments of the present invention, and various modifications and/or combinations thereof, can be widely applied to autonomously traveling floor washers that reproduce taught cleaning condition and a travel route so as to autonomously travel and perform cleaning.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomously traveling floor washer configured to reproduce a taught cleaning condition and travel route so as to autonomously travel and perform cleaning, the washer comprising:
    a cleaning unit including a washing liquid discharge port to discharge washing liquid to a floor surface and a squeegee to collect the washing liquid remaining on the floor surface, the cleaning unit being configured to clean the floor surface in accordance with the cleaning condition;
    a traveling unit configured to travel in accordance with an operator's operation or a travel control command;
    a position estimating unit configured to estimate position information containing position and direction information of the traveling unit on the travel route in a predetermined coordinate system;
    a cleaning condition teaching unit configured to receive an input of the cleaning condition by the operator and output the cleaning condition to the cleaning unit;
    a travel route teaching unit configured to receive a moving operation of the traveling unit by the operator;
    a taught data obtaining unit configured to obtain, at a taught data obtaining time, taught position information that is the position information estimated by the position estimating unit, and a taught cleaning condition that is the cleaning condition taught by the cleaning condition teaching unit, when a manual operation teaching mode is executed for teaching the cleaning condition and the travel route by the operator's operation;
    a cleaning schedule generation unit configured to generate and store a cleaning schedule in which the taught position information and the taught cleaning condition are associated with the taught data obtaining time;
    a cleaning schedule modifying unit configured to modify the cleaning schedule so that a washing liquid discharge position is included in a squeegee movement track, when the washing liquid discharge position calculated based on a position of the washing liquid discharge port at the taught data obtaining time is not included in the squeegee movement track calculated based on a position and width of the squeegee at the taught data obtaining time; and
    a cleaning reproduction unit configured to calculate a reproduced cleaning condition and a reproduced travel control command at a predetermined elapsed time from start of execution of an autonomous cleaning mode, on the basis of the taught data obtaining time, the taught cleaning condition, and the taught position information, which are stored in the cleaning schedule generated by the cleaning schedule generation unit or the cleaning schedule modified by the cleaning schedule modifying unit, and to output the reproduced cleaning condition and the reproduced travel control command to the cleaning unit and the traveling unit, respectively, when the autonomous cleaning mode is executed in which the autonomous travel and cleaning is performed.

2. The autonomously traveling floor washer according to claim 1, wherein the cleaning schedule modifying unit calculates the squeegee movement track on the basis of positions and widths of the squeegee at two points of the taught data obtaining time and a plurality of virtual positions and widths of the squeegee assumed between the two points.

3. The autonomously traveling floor washer according to claim 1, wherein
    the cleaning condition includes a discharge amount of the washing liquid discharged from the washing liquid discharge port, and
    the cleaning schedule modifying unit sets the discharge amount of the washing liquid to zero at a washing liquid discharge position that is not included in the squeegee movement track, so as to modify the cleaning schedule.

4. The autonomously traveling floor washer according to claim 1, wherein
    the cleaning unit further includes a suction port configured to suck the washing liquid on the floor surface,
    the cleaning condition includes a suction force of the suction port, and
    the cleaning schedule modifying unit increases the suction force for the washing liquid at a washing liquid discharge position that is not included in the squeegee movement track, so as to modify the cleaning schedule.

5. The autonomously traveling floor washer according to claim 1, wherein the cleaning schedule modifying unit determines whether or not a washing liquid discharge position is included in the squeegee movement track, in period from the current taught data obtaining time to taught data obtaining time after a predetermined elapsed time.

\* \* \* \* \*